United States Patent
Metke et al.

(10) Patent No.: US 7,743,094 B2
(45) Date of Patent: Jun. 22, 2010

(54) METHOD AND APPARATUS FOR REDIRECTION OF DOMAIN NAME SERVICE (DNS) PACKETS

(75) Inventors: Anthony R. Metke, Naperville, IL (US); Surender Kumar, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 357 days.

(21) Appl. No.: 11/369,395

(22) Filed: Mar. 7, 2006

(65) Prior Publication Data
US 2007/0211714 A1    Sep. 13, 2007

(51) Int. Cl.
G06F 15/16    (2006.01)
(52) U.S. Cl. .................. 709/203; 709/245; 709/221; 370/400
(58) Field of Classification Search .......... 709/200, 709/203, 221, 245; 370/238, 400, 401
See application file for complete search history.

(56) References Cited

U.S. PATENT DOCUMENTS

| 7,007,080 B2 * | 2/2006 | Wilson ................ 709/221 |
| 7,317,918 B2 * | 1/2008 | Ahuja et al. ............ 455/445 |
| 2003/0154306 A1 * | 8/2003 | Perry .................. 709/245 |
| 2005/0210139 A1 * | 9/2005 | Hightower et al. ........ 709/227 |
| 2006/0013158 A1 * | 1/2006 | Ahuja et al. ............ 370/328 |
| 2006/0069805 A1 | 3/2006 | LeBlanc et al. |
| 2006/0264227 A1 | 11/2006 | Takahashi et al. |
| 2007/0061462 A1 * | 3/2007 | Kim et al. ............... 709/226 |
| 2007/0211714 A1 * | 9/2007 | Metke et al. ............ 370/389 |
| 2007/0284443 A1 | 12/2007 | Anson et al. |

OTHER PUBLICATIONS

U.S. Appl. No. 11/018,301, filed Dec. 21, 2004, Anthony R. Metke et al.
USA Office Action Dated Oct. 30, 2008—U.S. Appl. No. 11/369,508—37 pages.
USA Office Action Dated May 14, 2009—U.S. Appl. No. 11/369,508—34 pages.

* cited by examiner

Primary Examiner—Salad Abdullahi
Assistant Examiner—El Hadji M Sall
(74) Attorney, Agent, or Firm—Randi L. Karpinia

(57) ABSTRACT

Techniques are provided which can allow a host to determine whether to send a DNS request via a distributed Domain Name Service (DNS) protocol or a regular DNS protocol.

4 Claims, 12 Drawing Sheets

SSID/DNS MODE TABLE

| SSID | DNS MODE |
|---|---|
| FD INCIDENT SCENE | AUTONOMOUS AD HOC |
| PD INCIDENT SCENE | AUTONOMOUS AD HOC |
| FIFTH_CIRCUIT_COURTHOUSE | INFRASTRUCTURE |
| DEFAULT HRB | INFRASTRUCTURE |
| DEFAULT INCIDENT SCENE | AUTONOMOUS AD HOC |
| PD_HOMENETWORK | EITHER INFRASTRUCTURE OR AUTONOMOUS AD HOC |

TABLE 2

*FIG. 10*

DOMAIN NAME/SSID TABLE

| DOMAIN NAME | SSID |
|---|---|
| .FD.IS.PS | FD INCIDENT SCENE |
| .PD.IS.PS | PD INCIDENT SCENE |
| FRED.SMITH.PS | PD INCIDENT SCENE |
| TOM.JONES.PS | FD INCIDENT SCENE |
| .IS.PS | DEFAULT INCIDENT SCENE |
| COURTHOUSE.HRB.PS | FIFTH_CIRCUIT_COURTHOUSE |
| AIRPORT.HRB.PS | O'HARE_HRB_SYSTEM |
| .HRB.PS | DEFAULT HRB |
| *ALL OTHER REQUESTED DOMAIN NAMES | PD_HOMENETWORK |

TABLE 1

*FIG. 9*

DOMAIN NAME/ DNS MODE TABLE

| DOMAIN NAME | DNS MODE |
|---|---|
| *.PS | AUTONOMOUS AD HOC |
| *.HRB.PS | INFRASTRUCTURE |
| * ALL OTHER REQUESTED DOMAIN NAMES | EITHER INFRASTRUCTURE OR AUTONOMOUS AD HOC |

TABLE 3

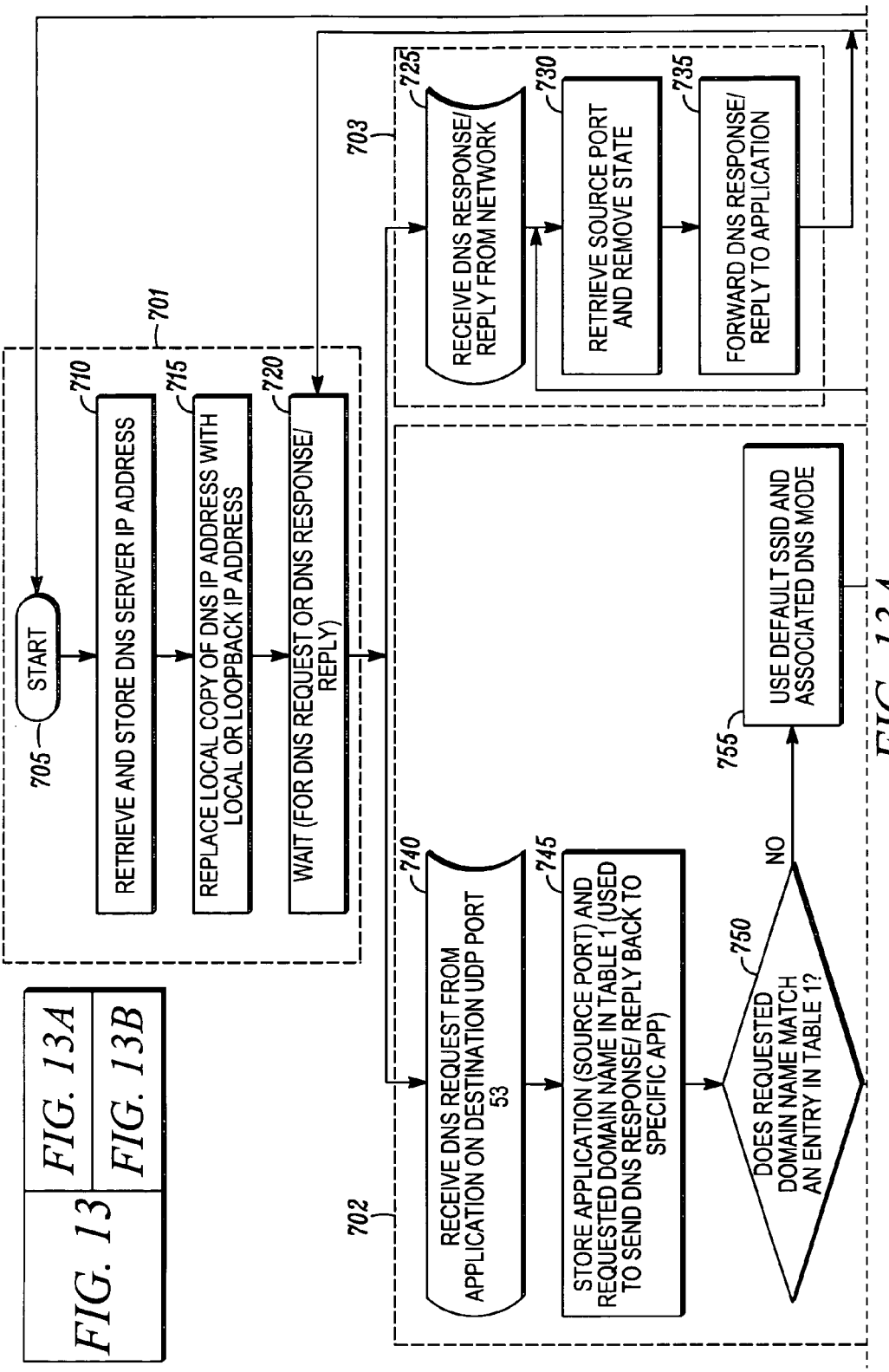

METHOD AND APPARATUS FOR REDIRECTION OF DOMAIN NAME SERVICE (DNS) PACKETS

RELATED APPLICATIONS

The present application is related to the following U.S. application commonly owned with this application by Motorola, Inc.: Ser. No. 11/369,508, filed of even date herewith on Mar. 7, 2006, titled "Method And Apparatus For Automated Infrastructure Ad Hoc Mode And Autonomous Ad Hoc Mode Selection", U.S. Patent Publication Number US 20070214283, published Sep. 13, 2007, the entire contents of which being incorporated herein by reference.

FIELD OF THE INVENTION

The present invention relates generally to wireless communications and more particularly to techniques used by a node for selecting an appropriate Domain Name Service (DNS) mode within an ad hoc network.

BACKGROUND

Wireless networks have experienced increased development in the past decade. Two types of wireless networks are infrastructure-based wireless networks, and ad hoc wireless networks.

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate with or without any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can be fixed or mobile and can communicate with each other over a wireless media without the support of an infrastructure-based or wired network. Ad hoc networks can also be self-healing. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

Currently there are a number of ad hoc wireless communication devices which can operate in one of two modes in an ad hoc network. These modes are sometimes referred to as an autonomous ad hoc mode and an infrastructure mode. In autonomous ad hoc mode, communications multi hop locally between peers or nodes in an ad hoc network. In infrastructure mode, communications hop from node to node to reach an infrastructure connection.

Typically when a user of a wireless communication device operating in ad hoc mode decides to communicate with one or more infrastructure devices and/or networks, the user manually switches from autonomous ad hoc mode to infrastructure mode so that the device can communicate with the infrastructure elements. Similarly, when a user of a wireless communication device operating in infrastructure mode decides to communicate with one or more ad hoc nodes and/or networks, the user manually switches from infrastructure mode to autonomous ad hoc mode so that the device can communicate with the ad hoc nodes. For example, a user may use a software tool on the device to select an infrastructure mode which allows the user to access infrastructure or may select an autonomous ad hoc mode which allows the device to operate exclusively in an ad hoc manner communicating with other nodes in the ad hoc network. There is no way to determine whether a destination for a particular communication is reachable via the infrastructure or from within the ad hoc network itself.

In addition, users of wireless local area networks (WLAN) or ad-hoc mesh networks manually switch their client configuration when they would like to move between different networks or Service Set Identifiers (SSIDs) (e.g., each network has a unique SSID). Unfortunately, "normal" infrastructure names do not easily translate to a specific SSID. For example, the domain name motorola.com could be reached from many different networks each having different SSIDs.

Domain Name Service (DNS)

A domain name is a meaningful and easy-to-remember identification for an Internet address. Because maintaining a central list of domain name/IP (internet protocol) address correspondences would be impractical, lists of domain names and IP addresses are distributed throughout the Internet in a hierarchy of authority. The Domain Name Service (DNS) provides techniques for locating Internet domain names and translating them into Internet Protocol (IP) addresses.

Every domain in the Internet has a database called a domain name server (DNS) that handles DNS requests (also referred as User Queries in DNS Standards) and that generates DNS replies/responses (also referred as User Responses in DNS Standards). DNS is standardized by the Internet Engineering Task Force (IETF) through documents called Request for Comments (RFC). There are dozens of such documents that together define DNS. These documents include, for example, RFC 1034, RFC 1035, RFC 1101, RFC 1183, RFC1348, RFC1876, RFC1982, RFC2065, RFC2181, RFC2308, RFC2535, RFC4033, RFC4034, RFC4035, RFC4343, RFC4035, etc. Among other functions, the DNS server translates or maps a particular human-readable domain name into a machine-readable IP address and provides that IP address to the user who entered the domain name into their client device.

To provide DNS functionality for autonomous ad hoc networks, co-pending U.S. patent application Ser. No. 11/018301, filed on Dec. 21, 2004 and titled "DISTRIBUTED DOMAIN NAME SERVICE," assigned to the assignee of the present invention, which is hereby incorporated by reference herein in its entirety, discloses a method of providing DNS functionality that is distributed among and throughout nodes in an autonomous ad hoc network. In other words, the infrastructure based DNS functionality that is typically provided by a DNS server that resides in the Internet is distributed among nodes in an ad hoc network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 9 is a first table which lists a plurality of domain names and corresponding SSIDs according to an exemplary implementation;

FIG. 10 is a second table which lists a plurality of SSIDs and corresponding DNS modes according to an exemplary implementation;

Figure 1:
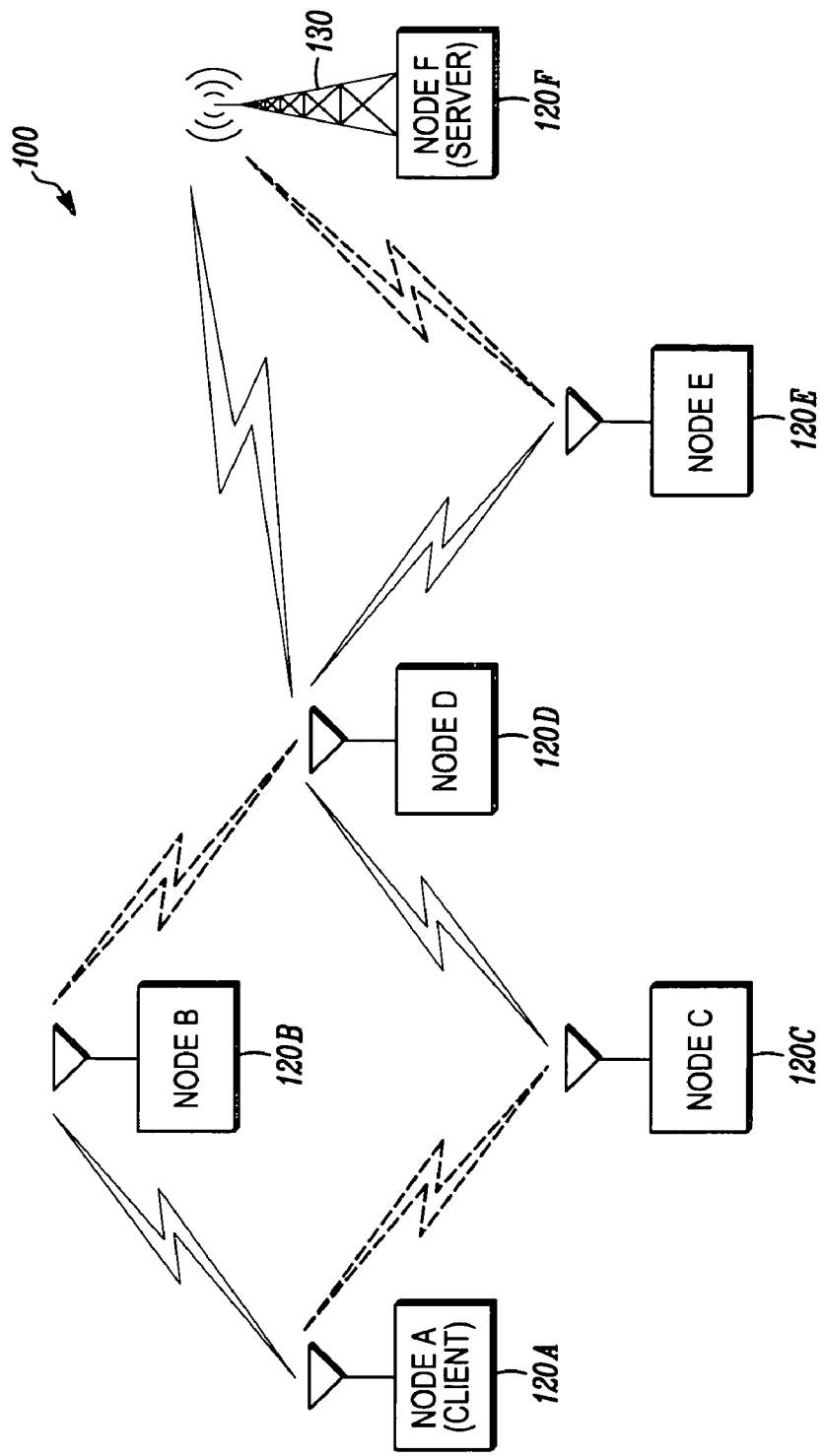
FIG. 1 is a block diagram of an exemplary ad hoc communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Before describing in detail embodiments that are in accordance with the present invention, it should be observed that the embodiments reside primarily in combinations of method steps and apparatus components related to automatic DNS mode selection and to redirecting DNS request packets and DNS response packets. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for automatic DNS mode selection and for redirecting DNS request packets and DNS response packets as described herein. The non-processor circuits may include, but are not limited to, a radio receiver, a radio transmitter, signal drivers, clock circuits, power source circuits, and user input devices. As such, these functions may be interpreted as steps of a method to perform automatic DNS mode selection and redirection of DNS request packets and DNS response packets. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

In most, if not all, development environments, application programmers include a GetHostByName function that is compiled into an application. When a user of a given node types in a given domain name, for example, motorola.com, the application calls the function GetHostByName, which builds a DNS request packet. The application then checks with the operating system and gets the IP address of the DNS server that has been configured on the local host, and sends the DNS request packet to the DNS server. Typically each node is configured with at least one DNS server, and the DNS request packet gets sent to the DNS server that is configured on the node. The DNS server sends back an IP address for motorola.com so that the given node may then connect to the appropriate server that provides the motorola.com service.

Existing Internet Protocol (IP) based applications rely on a DNS server to function properly. Autonomous ad hoc networks do not have a connection to an infrastructure, and therefore nodes in an autonomous ad hoc network typically do not have access to the services that an infrastructure provides including a DNS at a DNS server.

Distributed DNS In Autonomous Ad Hoc Networks

As noted above, co-pending U.S. patent application Ser. No. 11/018301, filed on Dec. 21, 2004 and titled "DISTRIBUTED DOMAIN NAME SERVICE," and assigned to the assignee of the present invention, discloses a method of providing DNS functionality that is distributed among and throughout nodes in an autonomous ad hoc network so that DNS functionality can be provided in autonomous ad hoc networks. The infrastructure based DNS functionality that is typically provided by a DNS server that resides in the Internet is distributed among nodes in an ad hoc network. In this system when the user enters a domain name into the node, the node broadcasts a DNS request to other nodes in the ad hoc network instead of transmitting the request to an infrastructure based DNS server. The DNS request is relayed through nodes until it reaches a node having the correct domain name. That node having the correct domain name then sends back a DNS reply with the appropriate IP address for the particular domain name that the user originally entered.

Techniques are provided for automatically selecting between different DNS protocols (e.g., infrastructure based DNS protocol or autonomous ad hoc based DNS protocol) that should be used to obtain an IP address corresponding to a particular domain name entered by the user. These techniques can automatically select which DNS protocol and DNS mode to use for each DNS request in a manner that is transparent to the user of a host, and can allow the host to determine whether to send a DNS request via a distributed DNS protocol or a regular DNS protocol. Other techniques are provided for automatically selecting and activating SSIDs without user intervention (e.g., without requiring the user to select a specific SSID or profile). Moreover, these techniques are provided without the need to recompile applications.

For example, in one embodiment, these techniques can allow a user of a host to enter a domain name, and the host automatically decides, based on the entered domain name, whether a DNS request packet should be sent to the autonomous ad hoc network or to an infrastructure based network. In other words, the node determines whether the DNS request packets should be transmitted using distributed DNS techniques within the ad hoc network or whether the DNS request should be transmitted to a DNS server located in the infrastructure based network (e.g., connected to the Internet). Thus, based on the domain name that is entered the host can decide which DNS mode and which DNS protocol to use.

According to one embodiment, a method of redirecting a first Domain Name Server (DNS) request packet generated by an application is provided. A first Internet Protocol (IP) address of a Domain Name Server (DNS) that is initially stored in an operating system of a node can be reconfigured such that the operating system interprets a DNS server as being located at a second IP address of a node. When an application generates a DNS request packet based on a requested domain name, the DNS request packet is sent to the second IP address of the node. For example, in one implementation, a node can be provided which comprises an input device, an application, an operating system, and a first module. The input device receives a requested domain name, and the application generates a Domain Name Server (DNS) request packet based on the requested domain name. The operating system is initially configured to store a first Internet Protocol (IP) address of a DNS server. The first module reconfigures the first IP address of the DNS server such that the operating system interprets a DNS server as being located at a second IP address of the node such that the DNS request packet is redirected to the first module.

According to another embodiment, a method is provided for deciding whether to communicate a Domain Name Service (DNS) request packet over a wireless link to either an infrastructure-based DNS server or an ad hoc network comprising at least one other node. A first Internet Protocol (IP) address of the infrastructure-based DNS server that is initially stored in an operating system is read, at start up, and the first IP address is stored for later use. The first IP address of the infrastructure-based DNS server is replaced with a second IP address of the node such that the operating system interprets the DNS server as being located at the second IP address. When an application receives a requested domain name, the application generates a first DNS request packet based on the requested domain name, and sends the first DNS request packet to the second IP address of the node. The first DNS request packet from the application is received at a first User Datagram Protocol (UDP) port. A decision can then be made whether to forward the first DNS request packet to either the infrastructure-based DNS server or the ad hoc network based on the requested domain name. The first DNS request packet can then be forwarded to either the infrastructure-based DNS server or to a node in the ad hoc network.

For example, in one implementation, a node can be configured to decide whether to communicate a Domain Name Service (DNS) request packet to either an infrastructure-based DNS server or an ad hoc network comprising at least one other node. The node may comprise an operating system, a first module, and an application. The operating system initially stores a first Internet Protocol (IP) address of the infrastructure-based DNS server. The first module reads the first IP address from the operating system at start up, stores the first IP address for later use, and replaces the first IP address with a second IP address of the node such that the operating system interprets the DNS server as being located at the second IP address. The application receives a requested domain name, generates a first DNS request packet based on the requested domain name, and sends the first DNS request packet to the second IP address of the node. The first module receives the first DNS request packet from the application at a first User Datagram Protocol (UDP) port, decides whether to forward the first DNS request packet to either the infrastructure-based DNS server or the ad hoc network based on the requested domain name, and forwards the first DNS request packet to either the infrastructure-based DNS server or to a node in the ad hoc network.

For example, techniques are provided for determining whether a particular SSID is an infrastructure based SSID or an autonomous ad hoc mode based SSID. These techniques can allow a multi-mode wireless communication device to use a domain name of a destination (for a particular communication) to determine whether an IP address for that destination can be obtained from a node in the autonomous ad hoc network or infrastructure-based network, and to determine the proper SSID and the proper DNS protocol to then use once it is determined whether that destination's IP address can be obtained from a node in the autonomous ad hoc network or infrastructure-based network. According to one implementation, a method is provided for obtaining an Internet Protocol (IP) address corresponding to a requested domain name. A node stores mapping information which can include a first list including at least one stored domain name, a second list including a corresponding network identifier associated with each stored domain name, and a third list including an appropriate one of the DNS modes associated with each corresponding network identifier. The node can determine whether the requested domain name matches at least one stored domain name in the first list, and, for each matching requested domain name, can determine the corresponding network identifier from the second list. The node can then use the corresponding network identifier for each matching requested domain name to automatically determine, from the third list, a corresponding DNS mode for obtaining the IP address corresponding to the requested domain name.

Exemplary Ad Hoc Network

FIG. 1 is a block diagram of an exemplary ad hoc communication network 100. The ad hoc communication network 100 comprises a plurality of nodes 120A-120F each having wireless repeater and routing capability and optionally at least one wired Access Point (AP) 130. In the exemplary network shown in FIG. 1 node 130 is a wired Access Point (AP) 130 having a direct connection to infrastructure including the Internet. It should be appreciated that while the ad hoc network 100 in FIG. 1 is shown as operating with wired AP 130, the ad hoc network 100 of FIG. 1 does not necessarily require any wired network to be present. Rather, the nodes 120A-E can support peer-to-peer communication without the need for wired infrastructure or other networks while operating in an "autonomous" ad hoc mode.

As used herein, a "node" is a mobile device operable in an autonomous ad hoc network and/or an infrastructure-based network such as wireless network or a WLAN. The term "mobile device" can generally refer to a wireless communication device or other hardware with which a network communicates. The nodes 120A-120F can be wireless devices capable of receiving packetized audio, video and/or data information. The nodes 120A-120F can communicate information packets over wireless carrier frequencies, each of which includes one or more wireless communication channels depending on the multiple access scheme utilized in the network 100. Some of the components in an exemplary node, such as a processor, transmitter, receiver and antenna, are described below in FIG. 2. A node may be fixed, stationary or mobile at any particular instant in time, and can include devices configured to communicate through a wireless channel or through a wired channel. A node may be embodied as any of a number of types of devices including but not limited to a personal computer (PC) having an external or internal wireless modem, a personal computer (PC) card, compact flash, a wireless communication device such as a cellular telephone or personal digital assistant (PDA). In one implementation, the wireless device comprises a mobile telephone which can also be called a mobile station (MS), mobile equipment (ME) or user equipment (UE). Each particular node in the ad hoc network has a particular domain name and IP address associated with it. The node's IP address can be fixed or different/unique for each session.

The ad hoc communication network 100 can implement routing intelligence, which is typically distributed among nodes 120A-120F to help improve overall network performance. In the ad hoc network 100, communications to or from nodes 120A-120F can "hop" through each other to reach other nodes 120A-120F in the network. In other words, nodes in close proximity can receive transmissions from nearby nodes utilizing the ad hoc air interface and relay these transmissions to other nodes, including access points or nodes with links to other wired or wireless networks.

The access points 130 are typically, but not necessarily required to be, coupled to a wired network (not shown) and can provide one or more sources of audio, video and/or data information. The access points 130 may be a cellular base station, a wireless access point that complies with the IEEE 802.11 Standard or other wireless local area network (WLAN) Standards, a Bluetooth access point, or the like. If access to a wired network is desired, communications from nodes 120A-E can hop to AP 130 (typically to the AP that is closest, but to an alternate AP if their current AP is congested or fails).

Although not shown in FIG. 1, it should be appreciated that the nodes 120A-120F, can also communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity driven multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

After initial deployment (FIG. 1), each node 120A-120F broadcasts a hello packet to its neighbor nodes. As used herein, a "hello packet" is a packet (message) that is sent out periodically from each node to establish and confirm network adjacency relationships. On networks capable of broadcast or multicast transmission, a hello packet can be sent from a node simultaneously to other nodes to discover neighboring nodes. Each node 120A-120F uses the hello packet received from their neighbor nodes to build an initial neighbor list that includes each of the node's neighbors. Thereafter, each node 120A-120F can advertise its presence by periodically broadcasting an advertisement or "hello" message. In turn, each node can identify its neighbor nodes, and maintain or update the neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 1, node 120A has two neighbor nodes—nodes 120B and 120C. As noted above, in many cases the topology of the ad hoc network changes significantly over time.

In FIG. 1, node 120A is referred to as a client and node 120F is referred to as a server. The other nodes 120 B-E are referred to as intermediate nodes and forward communications from a client node 120A to a server node 120F. A client is an endpoint of a communication which initiates a request for service to a server where the server is the recipient of the request. For purposes of illustration, node 120A is chosen as the client and node 120F is chosen as the server; however, any other node in the wireless communication system 100 may be the client and any other node in the wireless communication system 100 may be the server in a given situation.

When node 120A attempts to access the infrastructure (AP 130), node 120A requests a network address. As described herein, the network address disclosed is an Internet Protocol (IP) address, but, as is known in the art, other types of network addresses may be substituted herein. As used herein, the term "Internet Protocol (IP) address" refers to a layer 3 address, and can be at least one number which identifies each sender or receiver of information packets across the Internet. Each communication from a user carries an IP address of the source and destination networks and the particular machine within the network associated with the user or host computer at each end. An IP address generally comprises an identifier of a particular network on the Internet and an identifier of the particular device within that network. In one implementation, the IP address is a 32-bit address comprising one part which identifies the network with a network number and another part which identifies the specific machine or host within the network with a host number. Some of the bits in the machine or host part of the address can be used to identify a specific subnet. In this case, the IP address then contains three parts: the network number, the subnet number, and the machine number.

In one embodiment, the node 120A sends a Dynamic Host Configuration Protocol (DHCP) request packet to a DHCP server. If a DHCP response to the DHCP request packet is not received within a certain time period and/or within a certain number of attempts, then the node 120A determines that DHCP failed. Having determined that DHCP failed, the node 120A does not have an IP address for itself and assigns an IP address for itself. The node can be assigned an IP address in a number of different ways. For example, the IP address can be randomly chosen and if the node determines that another node in the wireless communication system 100 has the chosen IP address, then the node chooses another IP address. In any event, assigning the node an IP address may rely on knowledge of IP addresses that are not available for the node to use. Then, the node enters an autonomous ad-hoc mode in which the node does not have access to the infrastructure.

In autonomous ad hoc mode, each node can typically directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("hop-by-hop") until the packets reach the destination node. Each intermediate node acts as a router which can intelligently route the packets (e.g., data and control information) to another node until the packets eventually reach their final destination. To assist with relaying of packets, each node may maintain routes or routing information to other nodes in the network and can utilize routing techniques to adapt to changes in the interconnectivity between nodes. The nodes can maintain this routing information by performing periodic link and topology updates. Alternatively, nodes may discover routing information only when needed, instead of utilizing updates to maintain routes.

Exemplary Node

Figure 2:
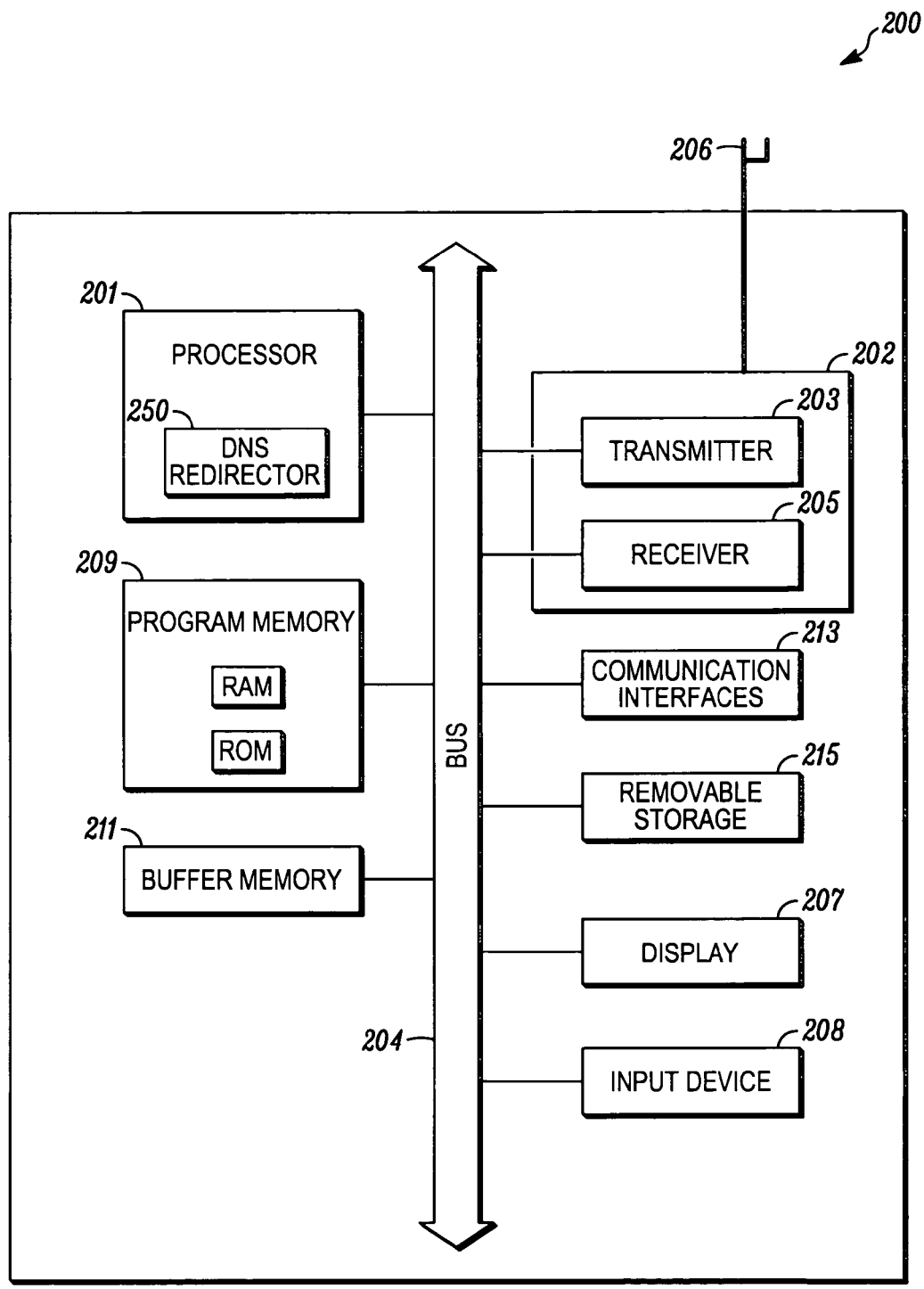
FIG. 2 is a block diagram of an exemplary node in accordance with some embodiments of the invention.

FIG. 2 is a block diagram of an exemplary node 200 in accordance with some embodiments of the invention. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage 215. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular electronic function. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The processor 201 also includes a network protocol stack (not shown) and a DNS redirector module 250 which will be described with reference to FIGS. 3-7 below.

The transmitter circuitry 203 and the receiver circuitry 205 enable the node 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 can operate over an ad hoc networking air interface (e.g., BLUETOOTH, 802.11 WLAN, 802.15.3, 802.16, and the like).

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless RF modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one band and optionally more bands, if the communications with the proximate device are in a frequency band other than that of the network communications. The receiver circuitry 205 may optionally comprise a first receiver and a second receiver, or one receiver capable of receiving in two or more bands. The receiver 205, depending on the mode of operation, may be tuned to receive, for example, Bluetooth or WLAN, such as 802.11, communication signals. The transceiver 202 includes at least one set of transmitter circuitry 203. The at least one transmitter 203 may be capable of transmitting to multiple devices potentially in multiple frequency bands.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 preferably further includes a video decoder capable of decoding the current Moving Picture Experts Group (MPEG) standard or some other video decoding standard. When the node 200 is further capable of transmitting video information, the node 200 preferably further includes a video encoder capable of encoding the video data into at least one of the foregoing video standards. Such video encoder and decoder is preferably implemented as part of the processor 201.

Techniques will now be described with reference to FIGS. 3-7 (below) for redirecting a DNS request packet generated by an application, and for deciding whether to communicate a DNS request packet over a wireless link to either an infrastructure-based DNS server or an ad hoc network comprising another node.

Figure 3:
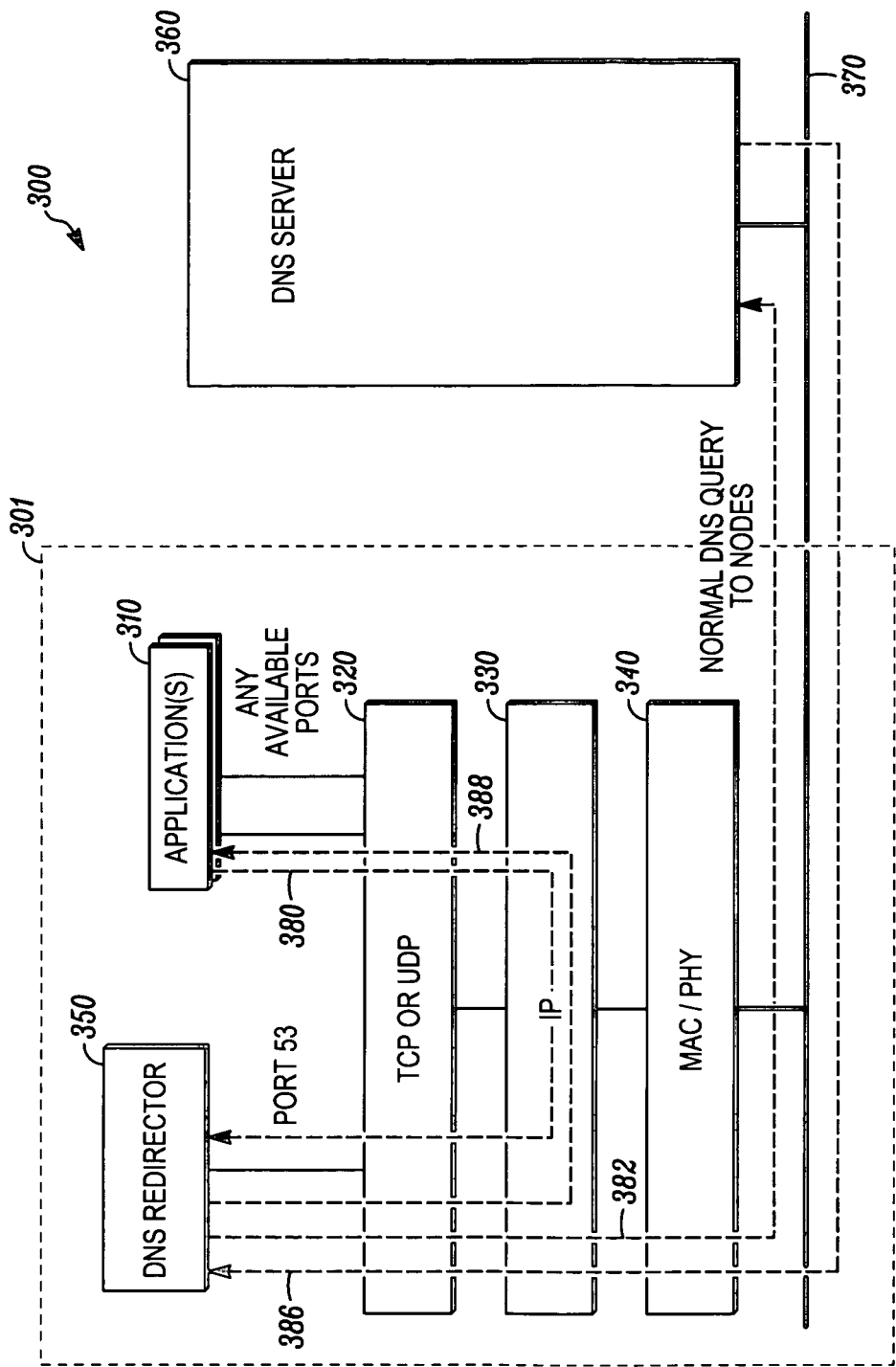
FIG. 3 is a simplified block diagram of a communication system including portions of an exemplary client node which communicate with an exemplary DNS server according to some embodiments.

FIG. 3 is a simplified block diagram of a communication system 300 including portions of an exemplary client node 301 which communicates with an exemplary DNS server 360 according to some embodiments. In FIG. 3, the node has automatically decided to perform a normal DNS query (at arrow 382) to obtain an IP address corresponding to a requested domain name from the DNS server 360 using some of the techniques described below in FIGS. 5-7.

Figure 4:
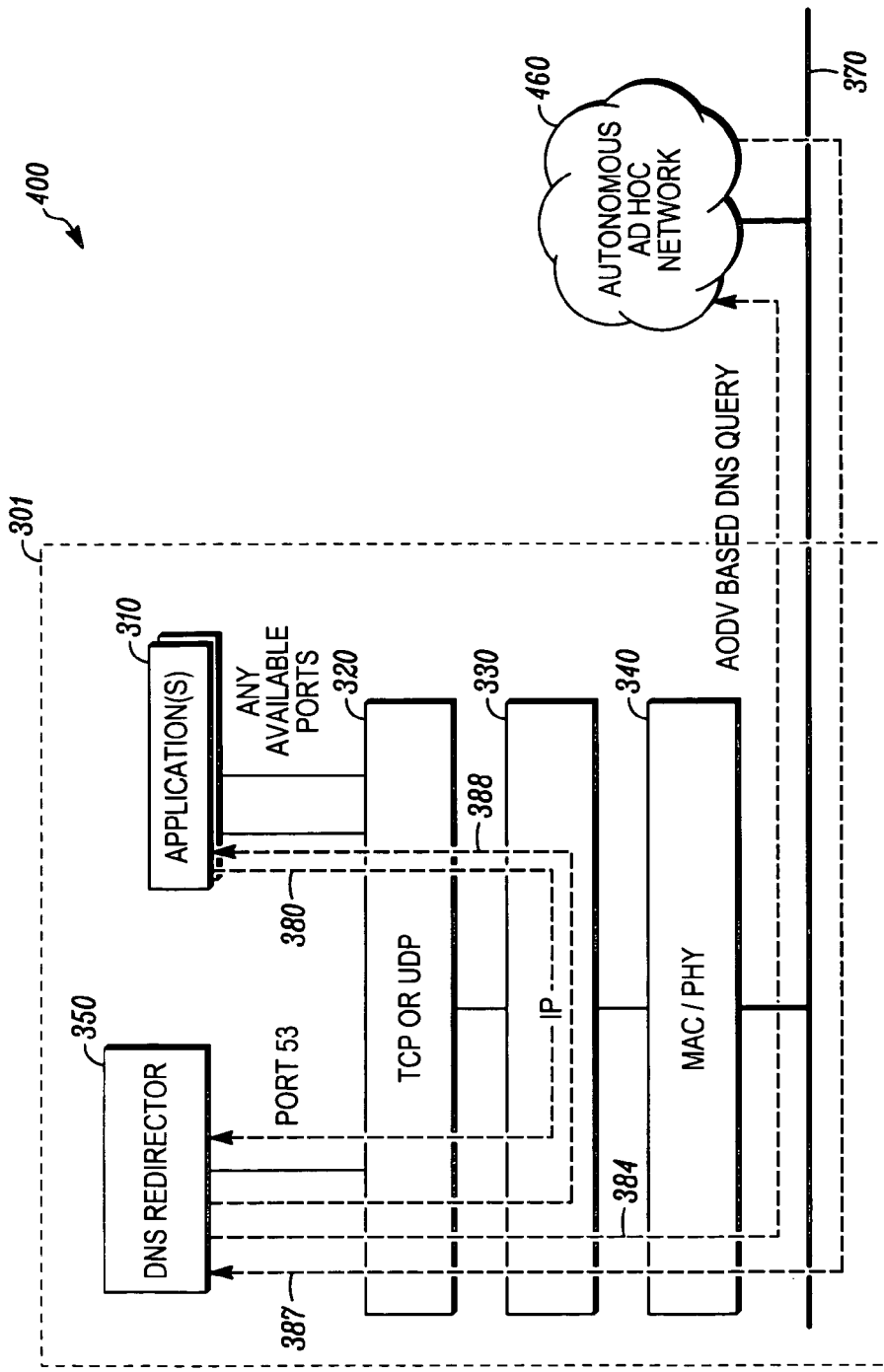
FIG. 4 is a simplified block diagram of a communication system including portions of an exemplary client node which communicate with an exemplary autonomous ad hoc network according to some embodiments.

FIG. 4 is a simplified block diagram of a communication system 400 including the portions of an exemplary client node 301 which communicates with an exemplary autonomous ad hoc network 460 over a wireless link 370 according to some embodiments. The ad hoc network shown in FIG. 4 may comprise at least one node and in many cases a number of nodes, as shown for example in FIG. 1. In FIG. 4, the node has automatically decided to perform an Ad-hoc On-demand Distance Vector (AODV)-based DNS query (at arrow 384) to obtain an IP address corresponding to a requested domain name from other nodes in an autonomous ad hoc network 460 using some of the techniques described below in FIGS. 5-7.

As shown in FIGS. 3 and 4, each client 301 can include a protocol stack comprising an application layer where application(s) 310 software resides, a transport (Transmission Control Protocol (TCP)/UDP) layer 320, and network (IP) layer 330 and a combined Media Access Control (MAC)/Physical layer 340. The client 301 also includes an application referred to as a DNS redirector 350 and an operating system (not shown).

The application layer provides high-level set-up services for an application program or an interactive user to ensure that communication with another application program in a network is possible. Among other things, the application layer ensures that the other party is identified and can be reached, can authenticate either the message sender or receiver or both, can ensure that necessary communication resources exist, can ensure agreement at both ends about error recovery procedures, data integrity, and privacy, and can determine protocol and data syntax rules at the application layer at which many TCP/UDP/IP services can be run. The application layer can include applications 310, such as, a web browser, electronic mail (e-mail) Readers (e.g., a simple mail transfer protocol (SMTP)), a video teleconferencing program, voice telephony applications, shared whiteboard, interactive gaming, and the like.

The transport layer 320 provides communication between source and destination computers, and breaks information from the application layer into packets. The transport layer 320 provides two methods of data delivery: connection-oriented delivery using a Transmission Control Protocol (TCP) layer and connectionless delivery using a User Datagram Protocol (UDP) layer.

The Transmission Control Protocol (TCP) layer governs the breakup of data messages into packets to be sent via the Internet Protocol (IP) layer 330, and the reassembly and verification of complete messages from packets received by IP layer 330. As used herein, the term "packet" refers to a unit of data that is routed between an origin and a destination on a packet-switched network such as the Internet. When any file is sent from one place to another on the Internet, the Transmission Control Protocol (TCP) layer divides the file into "chunks" of an efficient size for routing. Each of these packets is separately numbered and includes the Internet address of the destination. The individual packets for a given file may travel different routes through the Internet. Once all packets have arrived, the packets can be reassembled into the original file by the TCP layer at the receiving end. In the context of the User Datagram Protocol (UDP), it should be appreciated that the term "datagram" has a similar meaning to the term "packet," and that these terms are used interchangeably herein.

The User Datagram Protocol (UDP) layer converts data messages generated by an application into datagrams/packets to be sent via IP. While UDP performs some similar functions as TCP, it differs in that it is a connectionless protocol (e.g., does not establish a path between the sender and the receiver before transmitting and does not verify that messages have been delivered correctly). UDP uses the Internet Protocol to actually get a data unit (e.g., datagram) from one computer to another. Unlike TCP, however, UDP does not provide the service of dividing a message into packets (datagrams) and reassembling it at the other end since UDP does not provide sequencing of the packets that the data arrives in. As such, the application 310 that uses UDP must be able to make sure that the entire message has arrived and is in the right order. UDP provides UDP port numbers to help distinguish different user requests and, optionally, a checksum capability to verify that the data arrived intact. Port numbers can be used to identify a specific process to which an Internet or other network message is to be forwarded when it arrives at a server. For UDP, the port number is typically a 16-bit integer in the header appended to a message unit. This port number is passed logically between client and server transport layers and physically between the transport layer 320 and the IP layer 330 and forwarded on to the MAC/PHY layer 340.

The Internet Protocol (IP) layer 330 ensures the delivery of packets to the correct destination network. The IP layer 330 is responsible for addressing and routing packets (on the basis of routing algorithms) between networks. The IP layer 330 sends data from one computer to another on the Internet. Each computer (known as a host) on the Internet has at least one IP address which uniquely identifies it from all other computers on the Internet. When data is sent or received (for example, an e-mail note or a Web page), the message gets divided into smaller packets. Each of these packets contains both the sender's Internet address and the receiver's address. Because a message is divided into a number of packets, each packet can, if necessary, be sent by a different route across the Internet. IP is a connectionless protocol (e.g., there is no continuing connection between the end points that are communicating). Each packet that travels through the Internet is treated as an independent unit of data without any relation to any other unit of data. Packets can arrive in a different order than the order they were sent in.

Packet header field information can include, among other things an IP header field and a UDP header field. The IP header field can include source and destination IP addresses, while the UDP packet header field can include source and destination port numbers. It would be apparent to those skilled in the art that these packet header fields are given by way of example and are not intended to be an exhaustive list of useful packet header fields. In FIGS. 3 and 4, it is assumed that the DNS redirector 350 application resides at a UDP port. Although the DNS redirector 350 application may be implemented at any UDP port, in one implementation, the DNS redirector 350 application resides at UDP port 53 since many/most applications conventionally use UDP Port 53 to send DNS requests and to receive DNS responses. While the following description describes UDP as the transport layer protocol used for DNS, it should be appreciated that other transport protocols, such as TCP, could be used as the transport layer protocol for DNS, and that the term "transport layer protocol" can encompass either UDP or TCP, and the like.

Among other functions, the IP layer 330 decides for each given packet received form the lower layers, which protocol entity is to receive the packet by reading an IP header which includes a field called "protocol type". The protocol type field includes a number of possible values. For example, if protocol type field includes the value 17, this lets the IP know that this packet goes to UDP layer 320. By contrast, if protocol type field includes the value 6, this lets the IP layer 330 know that this packet goes to TCP layer.

Each UDP header includes a source port and a destination port. When the UDP layer 320 receives a packet from the IP layer, it examines the UDP destination port number specified in the UDP header, and provides the packet to the particular application at that UDP destination port number. For example, if the UDP destination port number is 53, then the UDP layer 320 sends the packet to a DNS server. For instance if a web browser application wants to send packet(s) to a DNS server, the web browser application will designate the destination port as UDP port 53 and send the packet to UDP port 53. The UDP source port is the UDP port assigned to the web browser application.

The DNS server reads the source port in the DNS request and uses the source port as the destination port when the DNS server generates the DNS response/reply. This way, the UDP layer 320, upon receiving the DNS response/reply, knows how to send the DNS response/reply back to the requesting application.

The MAC/Physical layer 340 comprises two separate logical layers, but is shown here as a single layer 340 for sake of convenience. Before transmitting frames, a node must first gain access to a radio channel that nodes share. For example, the 802.11 standard defines two forms of medium access, distributed coordination function (DCF) and point coordination function (PCF). The Media Access Control (MAC) layer is concerned with sharing the physical connection to the network among a plurality of computers each having its own unique MAC address. In general, the MAC Layer manages and maintains communications between nodes and/or access points (APs) by coordinating access to a shared radio channel and utilizing protocols that enhance communications over a wireless medium. Some of the 802.11 MAC functions include scanning (e.g., passive or active) for APs, authentication (e.g., open system authentication and shared key authentication), association with the AP before sending data frames, encryption (e.g., WEP or 802.1X), a request-to send and clear-to-send (RTS/CTS) function that allows the AP to control use of the radio channel, a power save mode that enables the radio to conserve battery power when there is no need to send data, and a fragmentation function that enables division of data packets into smaller frames.

The 802.11 MAC Layer uses an 802.11 Physical (PHY) Layer, such as IEEE 802.11b or 802.11a, to perform the tasks of carrier sensing, transmission, and receiving of 802.11 frames.

Figure 5:
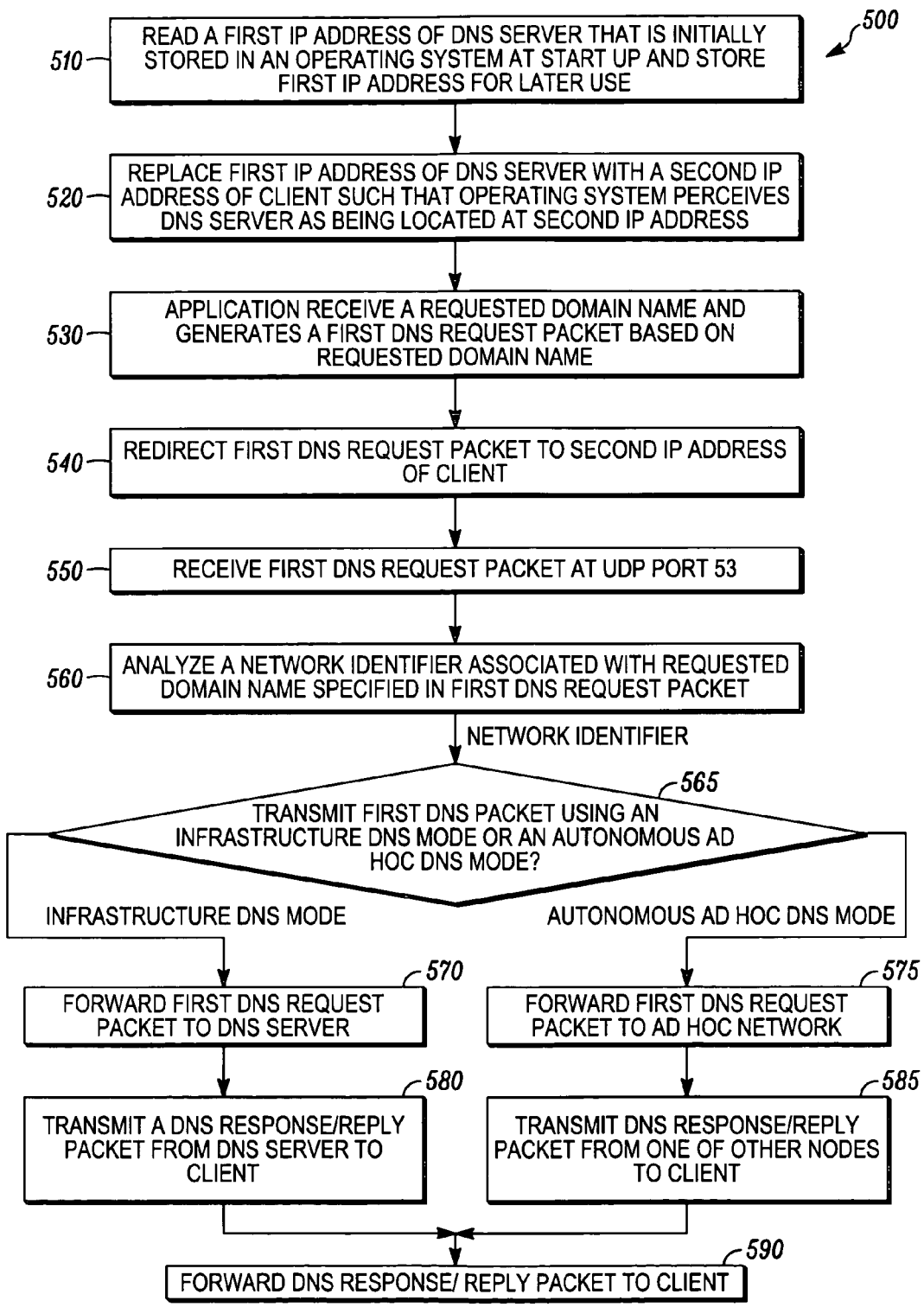
FIG. 5 is a flowchart showing an exemplary process for deciding whether to communicate a DNS request packet over a wireless link to either an infrastructure-based DNS server or an ad hoc network.

FIG. 5 is a flowchart showing an exemplary process 500 for deciding whether to communicate a DNS request packet over a wireless link to either an infrastructure-based DNS server 360 or another node in the autonomous ad hoc network 460. FIG. 5 will now be described with reference to FIGS. 3 and 4.

At start up, the operating system will run a Dynamic Host Configuration Protocol (DHCP) to learn the IP address of the node as well as the DNS server that the node is supposed to use from the DHCP response.

At step 510, the DNS redirector module 350 reads an IP address of the DNS server 360 (referred to below as a "first" IP address) that is initially stored in an operating system of the node, and stores the first IP address for later use. For example, in one implementation, when the DNS redirector 350 application first starts up (e.g., after power up and successful completion of DHCP), the DNS redirector 350 can read and store a DNS server's IP address stored in the operating system of the client 301.

At step 520, the DNS redirector module 350 replaces the first IP address of the DNS server 360 with a second IP address (or "loopback" IP address) such that the operating system interprets the DNS server 360 as being located at the second IP address.

For instance, in one implementation, the DNS redirector 350 replaces the first IP address with a "loop back IP address." An IP address can be expressed by four (4) numbers. The IP layer 330 interprets any number beginning with 127 (e.g., 127.000.000.001) to be a "loopback" IP address. If an application sends a packet to this loopback address, then the packet is sent to the device/node where the application resides. This loop back IP address can be used to make an IP packet, such as a DNS request packet, loop back around or return to the DNS redirector 350. Configuring the DNS redirector 350 with this loopback IP address allows the DNS redirector 350 to trick the operating system into thinking that the DNS redirector 350 is the DNS server 360 since the DNS redirector 350 has the IP address of the DNS server 360. Thus, whenever an application sends a DNS request packet, the network protocol stack will loop the DNS request packet back to the DNS redirector 350.

In another implementation, the same result will occur if the IP layer 330 receives a packet having the node's own unique IP address. If an application determines that the address of the node is 10.1.2.4, and the application specifies the destination address of a packet as being 10.1.2.4, then when the packet reaches the IP layer 330, the effect will be the same as if the destination for that packet was addressed to the loopback address; the IP layer 330, upon receiving the packet, determines that the packet is addressed to the device/node and sends the packet back up the protocol stack.

At step 530, the application 310 receives a requested domain name from an input device on the client 301, and generates a first DNS request packet based on the requested domain name. For example, when a user enters a particular domain name into the client 301, this triggers the application 310 to call a function GetHostByName, which builds a DNS request packet.

At step 540, the DNS redirector module 350 redirects or sends the first DNS request packet to the second IP address of the client 301. Conventionally, the application 310 would check with the operating system to obtain the IP address of the DNS server 360 that has been configured on the local client 301, and send the DNS request packet to the DNS server 360. However, because the DNS redirector 350 has been configured with this IP address, the DNS request packet will be sent to the DNS redirector 350. Operation of the DNS redirector 350 application be described below with reference to dotted line arrows 380-388.

At step 550, shown in FIGS. 3 and 4 by arrow 380, the DNS redirector module 350 receives the first DNS request packet at UDP port 53.

At step 560, the DNS redirector module 350 analyzes a network identifier associated with the requested domain name specified in the first DNS request packet, and at step 565, automatically decides, based on the network identifier, whether the first DNS packet will be transmitted using an infrastructure DNS mode or an autonomous ad hoc DNS mode.

If at step 565 the DNS redirector module 350 decides to use the infrastructure DNS mode, a regular DNS protocol can be used to transmit the first DNS request packet to an infrastructure-based DNS server 360 via a regular DNS query to obtain an IP address corresponding to the requested domain name from the infrastructure-based DNS server 360. At step 570, as shown in FIG. 3 by arrow 382, the DNS redirector module 350 forwards the first DNS request packet received from the application 310 to the DNS server 360. At step 580, as shown by arrow 386 in FIG. 3, the infrastructure-based DNS server 360 transmits, responsive to the first DNS request packet, a DNS response/reply packet back from the infrastructure-based DNS server 360 to the client 301, wherein the DNS response/reply packet comprises the IP address corresponding to the requested domain name.

By contrast if, at step 565, the DNS redirector module 350 decides to use the autonomous ad hoc DNS mode, then a distributed DNS protocol can be used to transmit the first DNS request packet to another node in an autonomous ad hoc network 460 via an AODV-based DNS query to obtain the IP address corresponding to the requested domain name from the other node in an autonomous ad hoc network 460. At step 575, as shown by arrow 384 in FIG. 4, the DNS redirector module 350 forwards the first DNS request packet received from the application 310 to the autonomous ad hoc network 460. In one embodiment, each node in the autonomous ad hoc network has a domain name and a corresponding IP address. In other embodiments, each node in the autonomous ad hoc network can serve as a proxy and store multiple domain names and corresponding IP addresses associated with each domain name.

Responsive to the first DNS request packet, at step 585, a target node in the autonomous ad hoc network 460 transmits a DNS response/reply packet back to the client 301, as shown by arrow 387 in FIG. 4. The DNS response/reply packet comprises the IP address corresponding to the requested domain name.

At step 590, as shown by arrow 388 in FIGS. 3 and 4, the DNS redirector module 350 forwards the DNS response/reply packets to the application 310 which originally initiated the DNS request.

Figure 6:
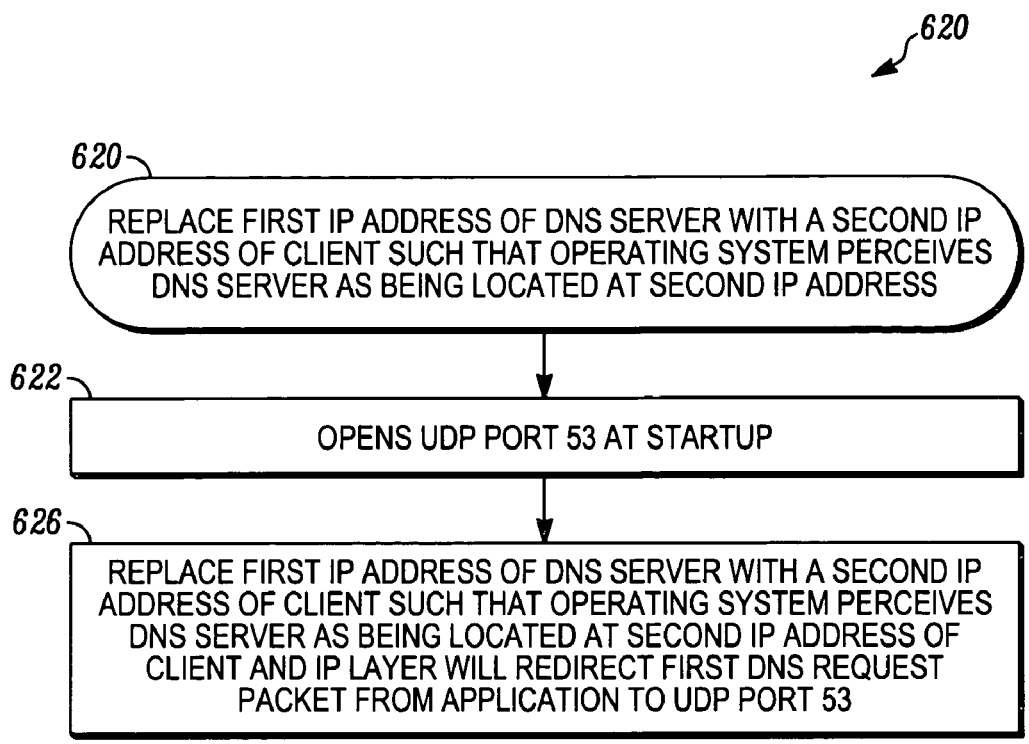
FIG. 6 is a flowchart showing an exemplary process for replacing the first IP address of the DNS server with a second IP address of a client in accordance with an exemplary implementation of the invention.

FIG. 6 is a flowchart showing an exemplary process 620 for replacing the first IP address of the DNS server 360 with a second IP address of the client 301 in accordance with an exemplary implementation of the invention. In this exemplary implementation, the DNS redirector module 350 resides at a first UPD port, such as, UDP port 53.

At step 622, the DNS redirector module 350 opens UDP port 53 at startup.

At step 626, the DNS redirector module 350 replaces the first IP address of the DNS server 360 with a second IP address of the client 301 such that the IP layer 330 redirects DNS request packets from the application 310 to UDP port 53. By replacing the first IP address of the DNS server 360 with a second IP address of the client 301, the operating system interprets the DNS server 360 as being located at the second IP address which is the IP address of the client 301. For example, when an application 301 running on the client 301 generates a DNS request packet (which is addressed to the DNS server 360), the DNS request packet will be internally forwarded by IP layer 330 to the DNS redirector 350 which is bound to UDP port 53. As such, the DNS redirector 350 effectively modifies the operating system's knowledge of where the DNS server 360 is located such that the operating system assumes that the DNS server 360 is located at the IP address of the client 301.

Figure 7:
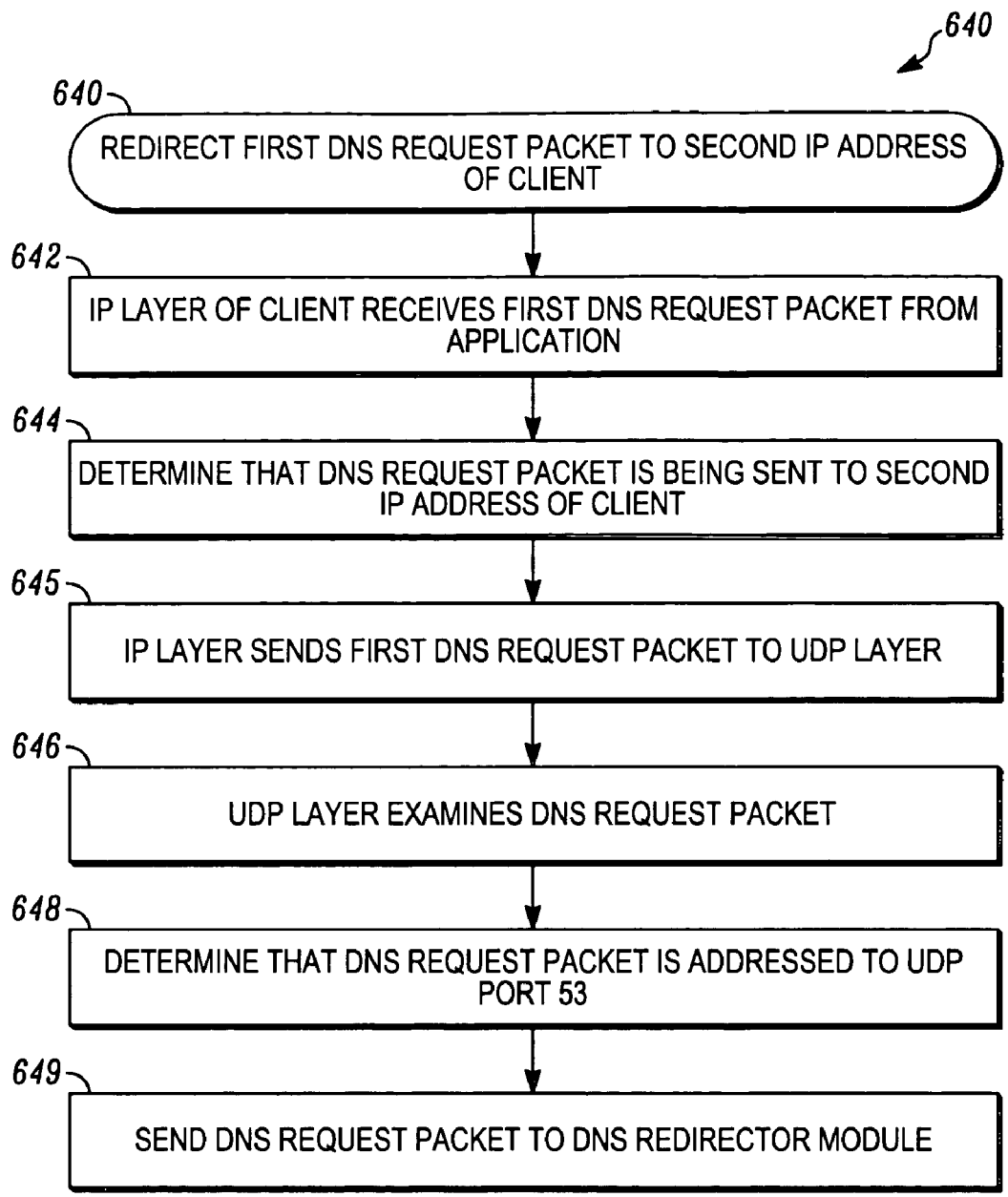
FIG. 7 is a flowchart showing an exemplary process for redirecting a DNS request packet to a second IP address associated with the client.

FIG. 7 is a flowchart showing an exemplary process 640 performed by the IP layer 330 for redirecting a DNS request packet to an IP address associated with the client 301. As shown at arrow 380 in FIGS. 3 and 4, the application 310 generates a DNS request packet and attempts to send this DNS request packet to the DNS server 360 by sending the DNS request packet through the protocol stack to UDP Port 53 where application 310 believes the DNS server 360 resides. Conventionally, the operating system would return the IP address of the DNS server 360.

However, with the DNS redirector 350 installed, at step 642, when the DNS request packet generated by the application 310 travels down the protocol stack and reaches the IP layer 330, the IP layer 330 determines, at step 644, that the DNS request packet is being sent to the IP address of the local client 301. Therefore, when the application 310 sends the DNS request packet to this IP address, the IP layer 330 determines that the DNS request packet is addressed to the IP address of the client 301.

At step 645, the IP layer 330 determines that the client 301 has a DNS process running locally at the DNS redirector 350 and sends or passes the first DNS request packet to TCP/UDP layer 320.

At step 646, the TCP/UDP layer 320, examines the DNS request packet and at step 648, determines that the DNS request packet is a UDP packet addressed to the application residing at UDP Port 53 (or other UDP port that is typically used for the DNS service). At step 649, TCP/UDP layer 320 sends the DNS request packet to UDP port 53 where the DNS redirector module 350 resides. Thus, all DNS request packets will be forwarded to the DNS redirector 350 application without modifying any code of the IP layer 330 or UDP layer 320.

Figure 8:
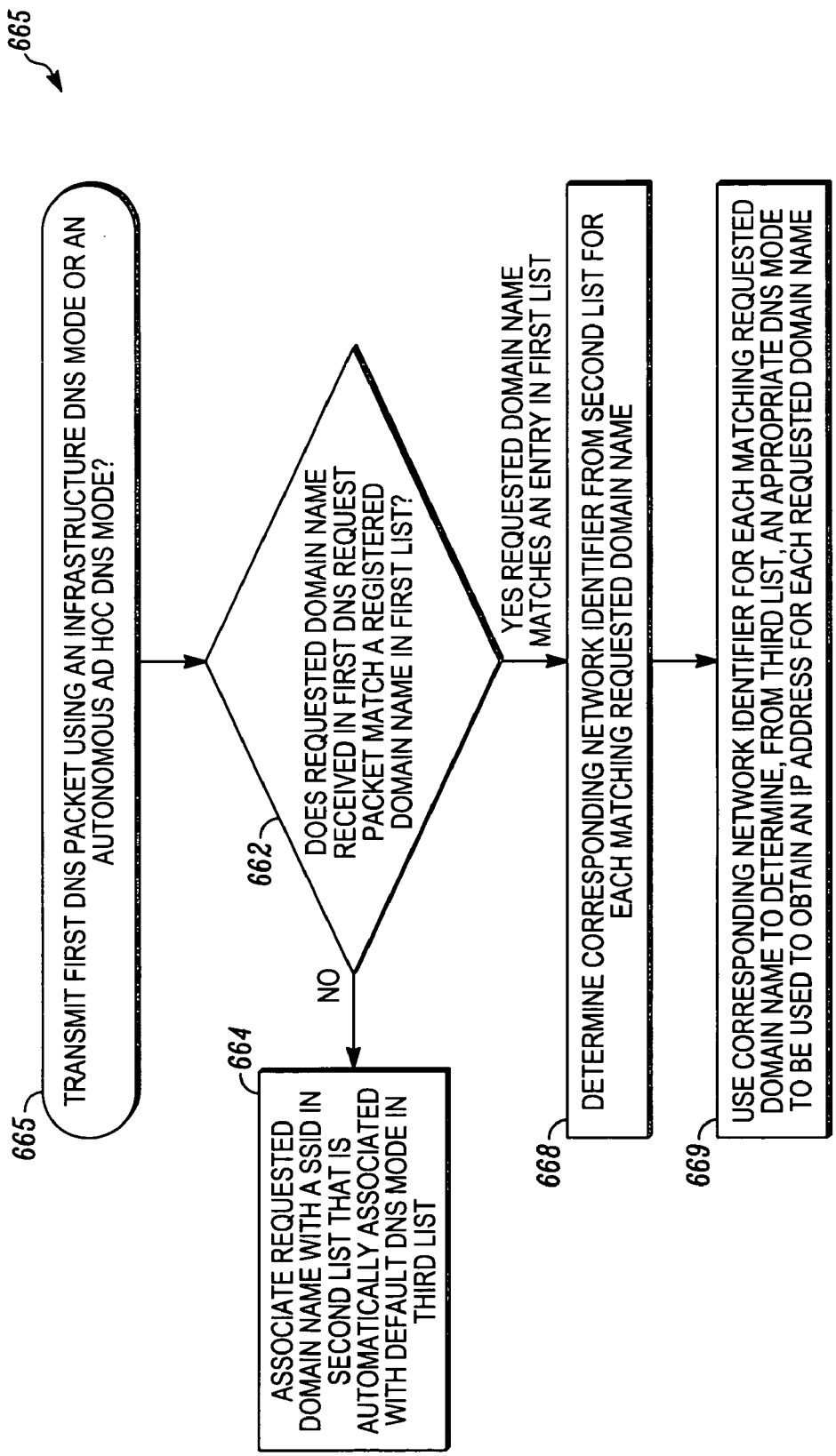
FIG. 8 is a flowchart showing an exemplary process for automatically deciding whether to transmit a DNS request packet using an infrastructure DNS mode or an autonomous ad hoc DNS mode in accordance with an exemplary implementation of the invention.

FIG. 8 is a flowchart showing an exemplary process 665 for automatically deciding whether to transmit a DNS request packet using an infrastructure DNS mode or an autonomous ad hoc DNS mode in accordance with an exemplary implementation of the invention. The DNS redirector module 350 can make this decision, for instance, based stored mapping information. In one embodiment, the mapping information may comprise, for example, a first list including at least one stored domain name, a second list including a corresponding network identifier associated with each stored domain name, and a third list including an appropriate one of the DNS modes associated with each corresponding network identifier. The stored domain names can be, for example, hierarchical non-infrastructure local domain names which are manually pre-configured on the client 301 prior to deployment. In one implementation, each network identifier comprises a Service Set Identifier (SSID) which specifies a name of a particular wireless local area network (WLAN). The first list and the second list associate a particular domain name with a corresponding SSID. The second list and the third list associate each corresponding SSID with a corresponding DNS mode. In another implementation, the first list and the third list can be used to directly associate a particular domain name with a corresponding DNS mode.

At step 662, the DNS redirector module 350 determines whether the requested domain name received in the first DNS request packet matches at least one stored domain name in the first list.

If the requested domain name does not match an entry in the first list, then at step 664, the DNS redirector module 350 associates the requested domain name with an SSID in the second list. The SSID is automatically associated with the a default DNS mode in the third list. The default DNS mode can be set as either an infrastructure DNS mode or an autonomous ad hoc DNS mode.

However, if the requested domain name matches at least one entry on the first list, the DNS redirector module 350 designates matches as matching requested domain names. At step 668, the DNS redirector module 350 determines a corresponding network identifier from the second list for each matching requested domain name.

At step 669, the DNS redirector module 350 uses the corresponding network identifier for each matching requested domain name to determine, from the third list, an appropriate DNS mode (e.g., infrastructure-based DNS mode or ad hoc autonomous DNS mode) to be used to obtain an IP address for each requested domain name.

Table Mapping

In one exemplary implementation of FIG. 8, the DNS redirector module 350 can automatically decide whether to transmit a DNS request packet using an infrastructure DNS mode or an autonomous ad hoc DNS mode using table mapping techniques which will now be described, for example, with reference to FIG. 9-11.

FIG. 9 is a first table (Table 1) which lists a plurality of domain names and corresponding SSIDs according to an exemplary implementation. FIG. 10 is a second table (Table 2) which lists a plurality of SSIDs and corresponding DNS modes according to an exemplary implementation. FIG. 11 is a third table (Table 3) which lists a plurality of domain names and corresponding DNS modes, according to an exemplary implementation.

Tables 1-3 can be stored in the client 301. It will be appreciated that while Tables 1-3 are shown as separate tables, in some implementations all three tables could be stored as a single table. In other words, Tables 1 and 2 could be one 3 column table or part of a larger table. Tables 1 and 2 allow a particular domain name to be associated with an SSID and that SSID to be associated with a particular DNS mode. Table 3 allows a particular domain name to be directly associated with a particular DNS mode. It will be appreciated that the example entries within Tables 1-3 and the number of entries in Tables 1-3 are only one exemplary implementation and that the particular entries within Tables 1-3 and the sizes of Tables 1-3 can vary depending on the specific implementation.

The first table (Table 1) includes a first column that corresponds to a "local services database" comprising a list of stored domain names associated with hosts that might potentially be used in the autonomous ad hoc network, and a second column with corresponding SSIDs for each domain name in column 1. In one implementation, Table 1 only includes domain names which would potentially be associated with autonomous ad hoc DNS mode devices. This is a restrictive embodiment and relies on the fact that any domain name not in a table is necessarily best reached through an infrastructure DNS mode. Each entry in column 1 of Table 1 can potentially support thousands or more of potential users. For example, in an alternative implementation, col. 1 of Table 1 might contain an entry *.PS that when entered into a particular node can allow that client to contact any node in the public safety (PS) domain via an ad hoc DNS mode. In the event a single organization needs to have multiple SSIDs (e.g., support multiple different networks), then multiple domain names and corresponding SSID can be entered in Table 1 for each sub-network. For example, in Table 1, within the domain name public safety (PS), the node belonging to Fred Smith has an SSID which belongs to police department (PD) incident scene (IS). As shown in Table 2, the SSID police department (PD) incident scene (IS) is reachable through autonomous ad hoc DNS mode.

In one implementation, the domain names in column 1 of Table 1 (or Table 3) can be non-infrastructure domain names or local domain names which are pre-configured (e.g., manually pre-defined) on the client 301 prior to deployment. Because this information is manually pre-configured it is static and does not change unless the user reconfigures it.

A service set identifier (SSID) is a sequence of alphanumeric characters (letters or numbers) which specify the name of a particular wireless local area network (WLAN). The SSID specifies the network the host wants to connect to. For example, the SSID lets the user know whether a particular access point (AP) is advertising connectivity to the Motorola Network, a residential WLAN, or something else. Wireless communication devices connected to a particular WLAN use the same SSID to communicate within that particular ad hoc network. The SSID can be set either manually, by entering the SSID into the client network settings, or automatically by leaving the SSID unspecified or blank.

The second table (Table 2) includes SSIDs in column 1, and corresponding DNS modes in column 2. The DNS mode can be either infrastructure DNS mode which uses a normal infrastructure DNS protocol to send a DNS request packet and obtain an IP address corresponding to the requested domain name, or autonomous ad hoc DNS mode which uses a distributed DNS protocol to send a DNS request packet and obtain an IP address corresponding to the requested domain name. Once the SSID corresponding to a particular domain name is known from column 2 of Table 1, the second table, (Table 2) allows the node to determine which DNS protocol to use based on the particular SSID in column 2 of Table 1.

In one implementation, when a user of client 301 enters a domain name, the client 301 can use Table 1 to map the domain name to a particular SSID, and then use Table 2 to map the particular SSID to either an ad hoc DNS mode or an infrastructure DNS mode. As described above with respect to arrow 380, the DNS redirector 350 receives a DNS requests and the DNS redirector 350 may then consult Table 1 to determine whether there is a corresponding SSID which corresponds to the particular domain name specified in the DNS request. The DNS redirector 350 may then decide whether to use autonomous ad hoc DNS protocol or an infrastructure DNS protocol to determine the appropriate IP address.

The DNS redirector 350 inspects the DNS request packet and determines the domain name specified in the DNS request packet. The DNS redirector 350 then determines if the domain name matches an entry in column 1 of Table 1. The DNS redirector 350 selects the corresponding SSID in column 2 of Table 1, and attempts to match the corresponding SSID with a DNS mode specified in column 2 of Table 2. For example, if the DNS request packet specifies a domain name Fred.Smith.PS (row 4, column 1 of Table 1), then the DNS redirector 350 would select the corresponding SSID, PD Incident Scene (row 4, column 2 of Table 1), and would match the corresponding SSID, PD Incident Scene (row 3, column 1 of Table 2), with an ad hoc DNS mode (specified in row 3, column 2 of Table 2). Thus, once the DNS redirector 350 performs the table matching, the DNS redirector 350 has determined if the ad hoc DNS mode or the infrastructure DNS mode is appropriate for transmitting the DNS request packet.

For instance, in the example shown in FIG. 3, it is assumed that the DNS redirector 350 has determined that the infrastructure DNS mode is appropriate for transmitting the DNS request packet. Because the DNS redirector 350 has determined that an infrastructure based DNS request is appropriate, at arrow 382 of FIG. 3, the DNS redirector 350 will send the DNS request packet to an infrastructure DNS server 360 via a normal DNS query where the normal DNS protocol will be used to determine the IP address associated with the domain name. The DNS redirector 350 knows the IP address of the DNS server 360 in the infrastructure network because the DNS redirector 350 read the IP address out of the operating system and saved a copy before the DNS redirector 350 replaced that IP address with the IP address of the local client 301. Thus, if a user enters the domain name, such as motorola.com, for example, the DNS redirector 350 will forward that DNS request packet to an Internet-based DNS server 360.

By contrast, in the example shown in FIG. 4, it is assumed that the DNS redirector 350 has determined that the ad hoc DNS mode is appropriate for transmitting the DNS request packet. Because the DNS redirector 350 has determined that an ad hoc DNS request is appropriate, at arrow 384 of FIG. 4, the DNS redirector 350 sends the DNS request packet to the autonomous ad hoc network 460 via an AODV-based DNS query where a distributed DNS protocol such as that described in co-pending U.S. patent application Ser. No. 11/018301, filed on Dec. 21, 2004 and titled "DISTRIBUTED DOMAIN NAME SERVICE," and assigned to the assignee of the present invention, can be used to determine the IP address associated with the domain name. For example, if the DNS request specifies a domain name Fred.Smith.PS, the DNS redirector 350 will determine that the corresponding SSID is a police department (PD) incident scene and use Table 2 to determine that the corresponding SSID is associated with an ad hoc DNS mode. The DNS redirector 350 will then build a new distributed DNS request packet and broadcast that packet throughout the autonomous ad hoc network 460 according to a protocol such as that specified in co-pending U.S. patent application Ser. No. 11/018301, filed on Dec. 21, 2004 and titled "DISTRIBUTED DOMAIN NAME SERVICE."

If a domain name is entered which does not have a corresponding SSID in Table 1, a default SSID will be specified to indicate a network the particular client 301 wants to connect if there are no matching domain names in column 1 of Table 1. The default SSID can be configured by the user such that it is associated with either the infrastructure DNS mode or with autonomous ad hoc DNS mode. In the example shown in FIG. 9, the last entry in column 1 of Table 1 shows an asterisk (*) and the corresponding entry in column 2 shows a default SSID. In this example, as shown in column 2 of Table 2, the default SSID is automatically associated with the infrastructure DNS mode.

The default SSID can be used, for example, if a user of the client 301 enters an unstored domain name, such as motorola.com. In this case, the DNS redirector 350 examines each entry in column 1 of Table 1 and determines that the requested domain name does not match a stored domain name in column 1 of Table 1. When the DNS redirector 350 hits the last entry in the first table, Table 1, it encounters a wild card (*) which the DNS redirector 350 determines is associated with a default SSID. In this example, as shown in column 2 of Table 2, the default SSID is associated with the infrastructure DNS mode. As such, the DNS redirector 350 uses the infrastructure based DNS mode (and the IP address of the DNS server which it previously obtained from the operating system and stored). The DNS redirector then sends a traditional DNS request to the IP address if an infrastructure-based DNS server which resides, for example, on the Internet.

In another implementation, the intermediate step of mapping the domain name to an SSID and then the SSID to a DNS mode can be eliminated. As shown, for example, in Table 3 of FIG. 11, a particular domain name entered into the client 301 can be directly translated to a particular DNS mode associated with that domain name. Thus, when the user of client 301 enters a domain name, the client 301 can use Table 3 to directly map the entered domain name to a particular DNS mode (e.g., ad hoc DNS mode or an infrastructure DNS mode).

Figures 11, 12:
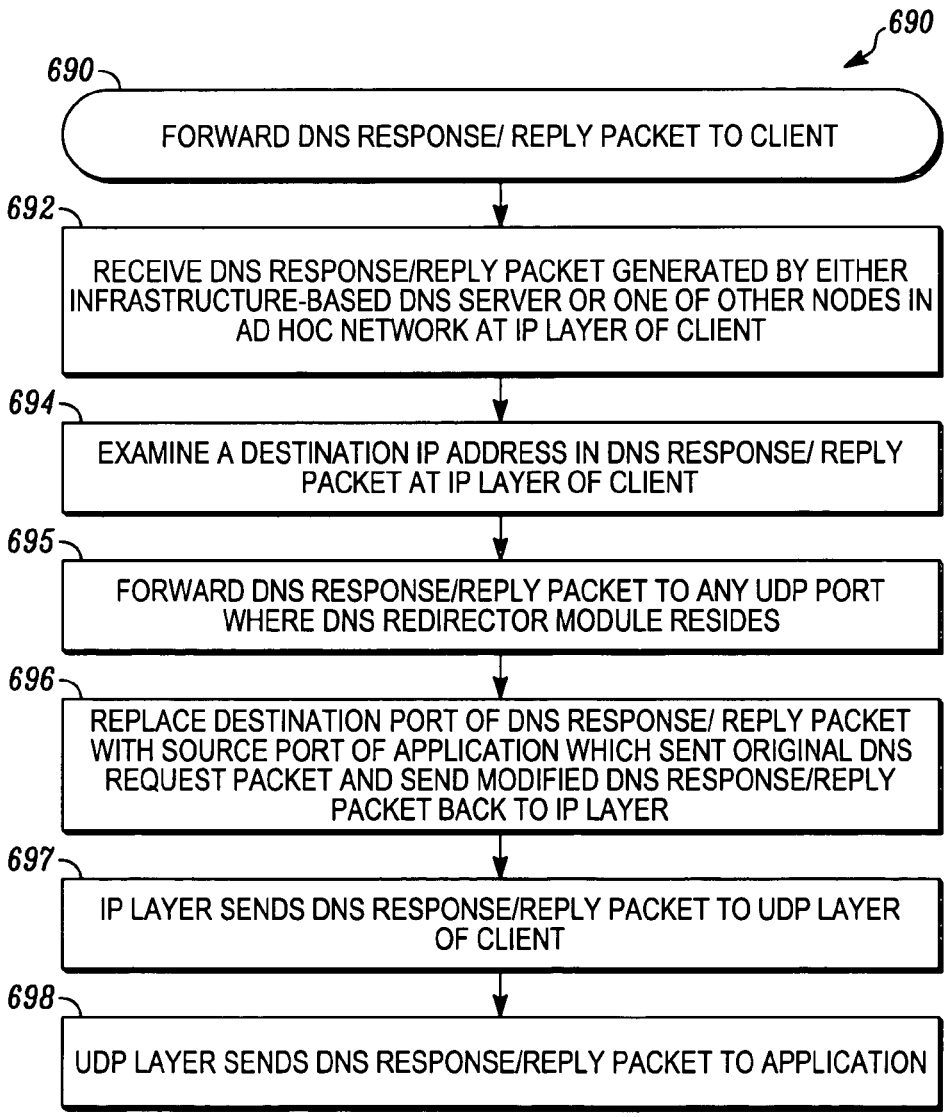
FIG. 11 is a third table which lists a plurality of domain names and corresponding DNS modes, according to an exemplary implementation.
FIG. 12 is a flowchart showing an exemplary process a client uses for processing DNS response/reply packets received generated by either the infrastructure-based DNS server or one of the other nodes in the autonomous ad hoc network in accordance with an exemplary implementation of the invention.

Although not shown in FIGS. 9-11, another table can also be stored which allows the DNS redirector 350 to store the DNS responses/replies that are received (which includes the IP addresses learned from each DNS response/reply) as well as routing information from the client 301 to the other node(s) that sent a DNS response/reply to avoid repeating the process for determining how to send the DNS response/reply back to the correct application. For example, a table (not shown in the figures) can be included which includes a first list containing the requested domain name (e.g., in column 1), a second list including source ports of the requesting applications that sent the original DNS requests (e.g., in column 2), and a third list that includes all of the DNS responses/replies, which includes the IP addresses learned from each DNS responses/replies that are received (e.g., in column 3), and a fourth list that includes routing information from the client 301 to the other node(s) that sent a DNS response/reply (e.g., column 4). Alternatively, to directly associate the requested domain names (e.g., in column 1), with the corresponding DNS responses/replies that are received (e.g., in column 3), the table could include just lists 1 and 3.

FIG. 12 is a flowchart showing an exemplary process 690 a client 301 uses for processing DNS response/reply packets generated by either the infrastructure-based DNS server 360 or one of the other nodes in the autonomous ad hoc network 460 in accordance with an exemplary implementation of the invention.

Before describing FIG. 12, please note that when an application 310 sends a DNS request packet, the application 310 uses the UDP port assigned to it by the operating system as the source UDP port which identifies the application 310. The DNS request packet has a header with the source port assigned to the application 310 and a destination port 53. The UDP layer 320 passes the DNS request packet to the IP layer 330. The IP layer 330 examines the destination IP address (which is the loopback address). The loopback address is a well-known IP address dedicated for a "loop back" function which lets the IP layer 330 know that the DNS request packet is being sent to the node/device which generated the DNS request packet. The IP layer 330 then sends the DNS request packet back up to the UDP layer 320. The UDP layer 320 examines the destination address of the DNS request packet and determines that it is addressed to UDP port 53, and sends it to the DNS redirector 350. The DNS redirector 350 still wants to receive the DNS response/reply. The DNS redirector 350 changes the IP address in the DNS request packet, but still addresses the DNS request packet to destination UDP port 53. The DNS redirector 350 changes the source port to that of the requesting application 310.

When either a node in the autonomous ad hoc network or the DNS server eventually responds, it changes the destination port in the DNS reply/response to the port assigned to the requesting application 310. When the DNS reply/response generated by either a node in the autonomous ad hoc network or the DNS server arrives at the client 301 (at step 692), at step 694 the IP layer 330 determines that it is addressed to the client 301, passes the packet to the UDP layer 320, and the UDP layer 320 determines that it is addressed to a UDP port of the DNS redirector (e.g., UDP port 53 or another UDP port), and forwards the DNS response/reply to that UDP port. It should be appreciated, that while in this implementation, the UDP port of the DNS redirector 350 is described as being UDP port 53, the DNS redirector 350 could have multiple UDP ports open to receive DNS responses/replies. As such, the DNS redirector 350 can determine whether it is receiving internal DNS requests from UDP port 53 (sent out from the client) or receiving external DNS replies/responses from another UDP port.

At step 696, the DNS redirector 350 replaces the application source port in the DNS request with any UDP source port (including source port 53) where the DNS redirector 350 application resides so that any DNS response/reply eventually returns to the DNS redirector 350. In other words, before the DNS redirector 350 sends the packet back to the IP layer 330, the DNS redirector 350 changes/replaces the destination port of the DNS response/reply packet it just received to be the source port of the application that was specified in the original DNS request (e.g., the source port of the requesting application that was stored/saved by the DNS redirector 350 when it first received the DNS request from the application) to generate a modified DNS response/reply packet. It should be appreciated that the DNS redirector 350 can be assigned multiple UDP ports and that the DNS redirector 350 can replace the application source port in the DNS request with any of the UDP source ports where the DNS redirector 350 application resides so that any DNS response/reply eventually returns to the DNS redirector 350.

According to one implementation, DNS responses/replies return to the DNS redirector 350. After the DNS redirector 350 receives the DNS request for the application (via UDP/IP), the DNS redirector 350 will store the target domain name and the SP (source port) in the DNS request in a table for later use. In other words, when the DNS redirector 350 receives the DNS request, the DNS redirector 350 stores the domain name and the source port from the DNS request. The DNS redirector 350 replaces the source port of the DNS request with its own source port (so that the response will come back to the DNS redirector 350) so that when the DNS redirector 350 later receives a DNS response/reply, it can copy the source port into the new destination port of the reply so that it can be sent back to the source application. In other words, when the DNS response/reply is received by the DNS redirector 350, the DNS redirector 350 looks up the target domain name and finds the original source port, overwrites the destination port in the DNS response/reply packet with this stored source port and sends the DNS response/reply packet to the network stack. The network stack can then forward the DNS response/reply packet, based on the destination port back, to the sourcing application.

At step 696, the DNS redirector 350 also sends the modified DNS response/reply packet down the protocol stack and when the modified DNS response/reply packet reaches the UDP layer 320, the UDP layer 320 knows that the modified DNS response/reply packet is an outgoing packet and hands the packet to the IP layer 330. At step 697, the IP layer 330 reads the destination address and determines that the destination address is that of the local node. The IP layer 330 then hands the modified DNS response/reply packet back up to UDP layer 320 which reads the new destination port and determines that modified DNS response/reply packet is addressed to the application that sent the original DNS request. At step 698, the UDP layer 320 then sends the modified DNS response/reply packet to the application.

According to another implementation, DNS responses/replies return directly to the application which sent the DNS request. When the DNS redirector 350 receives the DNS request for the application (via UDP/IP), the DNS redirector 350 does not change anything in the DNS request but instead decides which DNS method to use and transmit the DNS request packet (without modifying the source port) and does not keep any state information (e.g., so that when the DNS response/reply arrives it goes directly to the requesting application; the DNS redirector 350 does not know where the DNS response/reply is to be returned to). In this way when the DNS response/reply returns to this node it will be forwarded up the network protocol stack directly to the requesting (source) application.

As shown at arrow 386 of FIG. 3 and arrow 387 of FIG. 4, in response to the DNS request packet, a DNS response/reply packet will be sent back from either the infrastructure DNS server 360 or one of nodes to the DNS redirector 350, respectively, to the client 301. This DNS response/reply packet moves up through the protocol stack until it reaches IP layer 330.

Figure 13B:
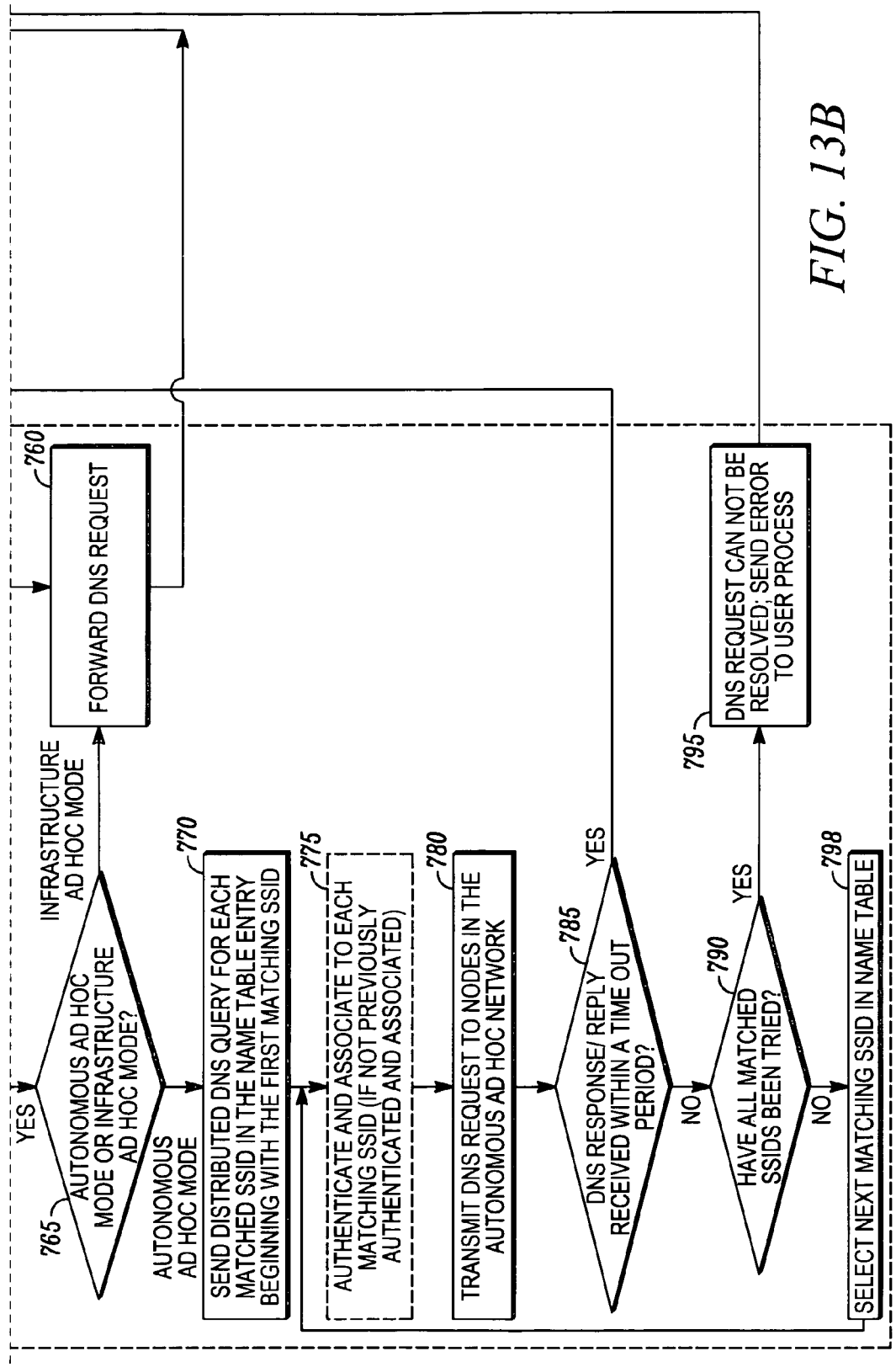
FIG. 13 is a flowchart showing an exemplary implementation of a process for automatic DNS mode selection and for redirecting DNS request packets and DNS response packets in accordance with an exemplary implementation of the invention.

FIG. 13 is a flowchart showing an exemplary implementation of a process 700 for redirecting DNS request packets and DNS response packets in accordance with an exemplary implementation of the invention. The process 700 can be implemented, for example, in the DNS redirector 350 of FIGS. 3 and 4. The process 700 is shown as being split into three sub-processes: sub-process 701 relates to pre-configuring the client device with stored domain name-to-DNS mode mapping information (e.g., information shown in FIGS. 9-11) and reconfiguring the IP address of the DNS Server 360 on the client 301 with the IP address of the client 301; sub-process 702 relates to processing that takes place when the client 301 receives a DNS request packet from an application 310; and sub-process 703 relates to processing that takes place when the client 301 receives a DNS reply/response packet from either the DNS server 360 or a node in the autonomous ad hoc network 460.

Prior to the start of the process 700 at step 705, stored domain name-to-DNS mode mapping information (e.g., information shown in FIGS. 9-11) can be pre-configured on the client 301.

In sub-process 701, at step 710, the DNS redirector 350 retrieves and stores an IP address of the DNS server 360. At step 715, the DNS redirector 350 replaces/overwrites the IP address of the DNS server 360 stored in the operating system with a local (or loopback) IP address of the client 301, and stores the IP address of the DNS server 360 for later use. At step 720, the DNS redirector 350 then waits until it receives either a DNS request packet from the application 310 (or alternatively a DNS reply/response packet from either the DNS server 360 or the autonomous ad hoc network 460).

At this point, the DNS redirector 350 has been pre-configured with the stored domain name-to-DNS mode mapping information (e.g., information shown in FIGS. 9-11) and re-configured with the IP address of the DNS server 360. When the application 310 sends out a DNS request packet, the process proceeds to sub-process 702. The DNS request packet from the application 310 passes through UDP layer 320 to IP layer 330. IP layer 350 determines the IP address in the DNS request packet and forwards the DNS request packet to the IP address. At step 740, the DNS redirector 350 receives the DNS request packet from the application 310 via destination UDP port 53.

At step 745, the DNS redirector 350 stores the source UDP port of the particular application 310 and the requested domain name for future use. While the following example describes a scenario where a DNS redirector 350 receives a single DNS request packet from a single application, it will be appreciated that the DNS redirector 350 is capable of simultaneously processing multiple DNS requests from multiple local applications 310, and storing a list of the different applications 310, which may be identified for example by their source ports, and the particular domain name/DNS request associated with each application 310. The DNS redirector 350 can later use the source UDP port of the application 310 and the requested domain name to send a DNS response/reply back to that particular application 310 during sub-process 703.

At step 750, the DNS redirector 350 determines whether the requested domain name matches an entry in "a local services database," which in this particular example is assumed to be column 1 of table 1 or Table 3 of FIG. 11.

If the DNS redirector determines that the requested domain name does not match an entry in local services database, then at step 755, the DNS redirector 350 uses a default SSID and associated DNS mode. At step 760, the DNS redirector 350 forwards the DNS request packet to either the autonomous ad hoc network 460 or the infrastructure based DNS server 360 and the process returns to step 720 where the DNS redirector 350 waits for its next DNS request packet or DNS response/reply packet in response to the DNS request packet.

If the DNS redirector 350 determines that the requested domain name matches an entry in the local services database, then at step 765, the DNS redirector 350 consults a list of corresponding network identifiers (e.g., SSIDs in column 1 of Table 2) to determine if the network ID corresponding to the requested domain name entry is associated with an autonomous ad hoc DNS mode or an infrastructure ad hoc DNS mode (e.g., as shown in col. 2 of Table 2 or 3).

If the DNS redirector 350 determines that the network ID corresponding to the requested domain name entry from the local services database is associated with the infrastructure DNS mode, then the process proceeds to step 760 where the DNS redirector forwards the DNS request packet to the infrastructure-based DNS server 360 and the process returns to step 720 where the DNS redirector 350 waits for its next DNS request packet or a DNS response/reply packet.

By contrast, if at step 765 the DNS redirector 350 determines that the network ID corresponding to the requested domain name entry is associated with an autonomous ad hoc DNS mode, then at step 770, the DNS redirector 350 sends a distributed DNS query for each matching network ID (e.g., each matched SSID entry in the domain name table) entry beginning with the first matching network ID. This is because at step 750 there are potentially multiple matching network IDs per requested domain name. These may be referred to as a primary, secondary, tertiary SSID. In step 770, the first matching network ID is considered first. As shown at step 790, this process will potentially repeat until all matching network IDs have been tried.

Other techniques are provided for automatically authenticating and associating a particular node with a particular SSID when the domain name that is entered by the node has not previously been authenticated and associated. Step 775, shown with a dotted line, is optional, since there is generally no need to associate and authenticate. However, authentication and association can be automatically initiated if the node has not previously been associated and authenticated with a particular network. In one implementation, if the user of the client 301 enters a domain name to which the client 301 has not been previously associated and authenticated, then the client 301 must first associate and authenticate to that particular SSID. In other words, if the client 301 has already (previously) been authenticated and associated with a particular network corresponding to one of the matching SSIDs, then step 775 is not performed. On the other hand if the client 301 has not already (previously) been authenticated and associated with a particular network corresponding to one of the matching SSIDs, then at step 775, the DNS redirector 350 authenticates and associates with each network which the client 301 has not previously been authenticated and associated with.

At step 780, DNS redirector 350 forwards the DNS request packet to nodes in the autonomous ad hoc network 460. Each node may implement a distributed DNS protocol, such as that described in co-pending U.S. patent application Ser. No. 11/018301, filed on Dec. 21, 2004 and titled "DISTRIBUTED DOMAIN NAME SERVICE." The client 301 broadcasts the DNS request packet to other nodes in the autonomous ad hoc network 460 instead of transmitting the DNS request packet to an infrastructure based DNS server 360. The DNS request packet is relayed (e.g., rebroadcast) and/or routed through nodes in the autonomous ad hoc network 460 until it reaches a target node having the correct domain name. The target node then sends back a DNS response/reply packet with the appropriate IP address for the particular domain name that the user of client 301 originally entered. Receipt of the DNS response/reply packet by client 301 (DNS redirector 350) at step 720 triggers sub-process 703 which will be described below.

At step 785, the DNS redirector 350 determines whether the DNS response/reply was received from the target node having the correct domain name within a time out period. If the DNS redirector 350 determines that the DNS response/reply was received from the target node within the time out period, then the process proceeds to step 730 which is discussed below.

If the DNS redirector 350 determines that the DNS response/reply was not received from the target node within a time out period, then at step 790, the DNS redirector 350 determines whether all of the matching network identifiers (e.g., SSIDs) have been tried. If all of the matching network identifiers (e.g., SSIDs) have been tried, then at step 795, the DNS redirector 350 determines that the DNS request can not be resolved (and optionally sends an error to the DNS redirector 350), and the process restarts at step 705. If all of the matched SSIDs have not yet been tried, then the process 700 proceeds to step 798 and selects the next matched SSID, and returns to step 775.

As mentioned above, process 700 proceeds to sub-process 703 when the client 301, receives a DNS reply/response packet (from either the DNS server 360 or a node in the autonomous ad hoc network 460) at step 725. At step 730, the DNS redirector 350 retrieves the source port for the particular application 310 (which was stored at step 745) and deletes any state specific to the routing of data packets associated with that DNS request since the IP layer will do this and packets will be routed appropriately. At step 735, the DNS redirector 350 uses the source UDP port of the application 310 to forward the DNS response/reply back to the particular requesting application 310.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of redirecting a Domain Name Server (DNS) request packet generated by an application, the method comprising:
    reading an Internet Protocol (IP) address of an infrastructure-based Domain Name Server that is initially stored in the operating system of a client node at start up;
    replacing the IP address of the infrastructure-based Domain Name Server with an IP address of the client node such that the operating system interprets the infrastructure-based Domain Name Server as being located at the IP address of the client node;
    running a second application at a Transport Layer Protocol (TLP) port which listens for packets addressed to the Transport Layer Protocol (TLP) port designated for Domain Name System Servers;
    generating, at the application in the client node, the DNS request packet based on a requested domain name;
    redirecting the DNS request packet to the IP address of the client node;
    determining, by the second application, whether to forward the DNS request packet either to the infrastructure-based Domain Name Server or at least one other node in an autonomous ad hoc network based at least in part on a network identifier associated with the requested domain name; and
    forwarding the DNS request packet to either the infrastructure-based Domain Name Server or the autonomous ad hoc network.

2. A method according to claim 1, further comprising:
    storing the IP address of the infrastructure-based Domain Name Server for later use.

3. A node, comprising:
    an application configured to generate a Domain Name Server (DNS) request packet based on a requested domain name;
    an operating system initially configured to store an Internet Protocol (IP) address of an infrastructure-based Domain Name Server; and
    a first module configured to:
        read an Internet Protocol (IP) address of an infrastructure-based Domain Name Server that is initially stored in the operating system of a client node at start up; and
        replace the IP address of the infrastructure-based Domain Name Server with an IP address of the client node such that the operating system interprets the infrastructure-based Domain Name Server as being located at the IP address of the client node;
    a second application running at a Transport Layer Protocol (TLP) port configured to listen for packets addressed to the Transport Layer Protocol (TLP) port designated for Domain Name System Servers;
    the application further configured to generate the DNS request packet based on the requested domain name;
    the operating system further configured to redirect the DNS request packet to the IP address of the client node;
    the second application further configured to determine whether to forward the DNS request packet either to the infrastructure-based Domain Name Server or at least one other node in an autonomous ad hoc network based at least in part on a network identifier associated with the requested domain name; and
    a transceiver configured to forward the DNS request packet to either the infrastructure-based Domain Name Server or the autonomous ad hoc network.

4. A node according to claim 3, wherein the first module is configured to store the IP address of the infrastructure-based Domain Name Server for later use.

* * * * *